United States Patent
Kadu et al.

(10) Patent No.: US 10,659,749 B2
(45) Date of Patent: May 19, 2020

(54) EFFICIENT HISTOGRAM-BASED LUMA LOOK MATCHING

(71) Applicant: Dolby Laboratories Licensing Corporation, San Francisco, CA (US)

(72) Inventors: Harshad Kadu, Santa Clara, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/312,251

(22) PCT Filed: Jun. 28, 2017

(86) PCT No.: PCT/US2017/039839
§ 371 (c)(1),
(2) Date: Dec. 20, 2018

(87) PCT Pub. No.: WO2018/005705
PCT Pub. Date: Jan. 4, 2018

(65) Prior Publication Data
US 2019/0208173 A1    Jul. 4, 2019

Related U.S. Application Data

(60) Provisional application No. 62/356,087, filed on Jun. 29, 2016.

(30) Foreign Application Priority Data

Jun. 29, 2016 (GB) .................................. 1611253.4

(51) Int. Cl.
*H04N 11/20* (2006.01)
*H04N 19/186* (2014.01)
(Continued)

(52) U.S. Cl.
CPC ............. *H04N 11/20* (2013.01); *G06T 5/008* (2013.01); *G06T 5/009* (2013.01); *G06T 5/40* (2013.01);
(Continued)

(58) Field of Classification Search
None
See application file for complete search history.

(56) References Cited

U.S. PATENT DOCUMENTS 8,593,480 B1   11/2013   Ballestad et al.
9,264,681 B2   2/2016   Gish et al.
(Continued)

FOREIGN PATENT DOCUMENTS

CN    103493489    1/2014
CN    103563372    2/2014
(Continued)

OTHER PUBLICATIONS

Oliver Y et al., "HDR CE2-related: some experiments on reshaping with input SDR", 23 JCT-VC Meeting; Feb. 19, 2016 to Feb. 26, 2016, San Diego, ( Joint Collaborative Team on Video Coding of ISO/IEC JTC1/SC29/WG11 and ITU-T SG.16); URL: HTTP://WFTP3.ITU.INT/AV-ARCH/JCTVC-SITE/, No. JCTVC-WOO89, Feb. 15, 2016.
(Continued)

*Primary Examiner* — Samira Monshi

(57) ABSTRACT

In a method to reconstruct a high dynamic range video signal, a decoder receives parameters in the input bitstream to generate a prediction function. Using the prediction function, it generates a first set of nodes for a first prediction lookup table, wherein each node is characterized by an input node value and an output node value. Then, it modifies the output node values of one or more of the first set of nodes to generate a second set of nodes for a second prediction
(Continued)

lookup table, and generates output prediction values using the second lookup table. Low-complexity methods to modify the output node value of a current node in the first set of nodes based on computing modified slopes between the current node and nodes surrounds the current node are presented.

19 Claims, 12 Drawing Sheets

(51) Int. Cl.
*H04N 19/182* (2014.01)
*G06T 5/40* (2006.01)
*H04N 19/117* (2014.01)
*H04N 19/154* (2014.01)
*G06T 5/00* (2006.01)
*H04N 19/126* (2014.01)
*H04N 9/64* (2006.01)
*H04N 9/67* (2006.01)

(52) U.S. Cl.
CPC .............. *H04N 9/646* (2013.01); *H04N 9/67* (2013.01); *H04N 19/117* (2014.11); *H04N 19/126* (2014.11); *H04N 19/154* (2014.11); *H04N 19/182* (2014.11); *H04N 19/186* (2014.11); *G06T 2207/10016* (2013.01); *G06T 2207/20208* (2013.01)

(56) References Cited

U.S. PATENT DOCUMENTS

| | | |
|---|---|---|
| 2010/0157078 A1 | 6/2010 | Atanassov |
| 2010/0172411 A1 | 7/2010 | Efremov |
| 2014/0050271 A1 | 2/2014 | Su |
| 2014/0307796 A1 | 10/2014 | Su |
| 2019/0130542 A1* | 5/2019 | Tichelaar ................ G06T 5/007 |

FOREIGN PATENT DOCUMENTS

| | | |
|---|---|---|
| EP | 2200268 | 6/2010 |
| EP | 3029925 | 6/2016 |
| WO | 2012/142506 | 10/2012 |
| WO | 2015180854 A1 | 12/2015 |
| WO | 2016/140954 | 9/2016 |
| WO | 2017/003525 | 1/2017 |
| WO | 2017/165494 | 9/2017 |

OTHER PUBLICATIONS

Minoo (Arris) K. et al. "Description of the reshaper parameters derivation process in ETM reference software", 23 JCT-VC Meeting; Feb. 19, 2016 to Feb. 26, 2016; San Diego; (Joint Collaborative Team on Video Coding of ISO/IEC JTC1/SC29/WG11 and ITU-T SG.16), URL: HTTP://WFTP3.ITU.INT/AV-ARCH/JCTVC-SITE/., No. JCTVC-W0031, Jan. 11, 2016 (Jan. 11, 2016), XP030117798.

ITU REC.ITU-R BT.1886 "Reference Electro-Optical Transfer Function for Flat Panel Displays Used in HDTV Studio Production" Mar. 2011.

Itu-R Report BT 2390-0, "High Dynamic Range Television for Production and International Programme Exchange" 2016.

SMPTE ST 2084:2014 "High Dynamic Range EOTF of Mastering Reference Displays".

Stessen, J. et al "Chromaticity Based Color Signals for Wide Color Gamut and High Dynamic Range" ISO/IEC JTC1/SC29/WG11 MPEG 2014, Oct. 2014.

Pouli, T. et al "Progressive Histogram Reshaping for Creative Color Transfer and Tone Reproduction" Bristol University, 2010.

Mai, Z. et al "Optimizing a Tone Curve for Backward-Compatible High Dynamic Range Image and Video Compression" IEEE Transactions on Image Processing, vol. 20, No. 6, Jun. 2011, pp. 1558-1571.

* cited by examiner generate, based on (a) a luma histogram over a high dynamic range and (b) combinations of candidate parameter values for luma mapping parameters, luma histograms over a relatively narrow dynamic range 402 compare the luma histograms with a luma histogram of reference tone-mapped images 404 select, based on results of comparing, a specific combination of candidate parameter values 406 use a luma forward reshaping function with the specific combination of candidate parameter values to forward reshape luma components of input images into luma components of forward reshaped images 408 transmit the forward reshaped images with backward reshaping metadata to recipient devices 410

*FIG. 4A*

EFFICIENT HISTOGRAM-BASED LUMA LOOK MATCHING

CROSS REFERENCE TO RELATED APPLICATIONS

The present application claims benefit of and claims priority to U.S. Provisional Application No. 62/356,087 and British Patent Application No. 1611253.4, both filed on Jun. 29, 2016, the disclosures of which are incorporated herein by reference in their entirety.

TECHNOLOGY

The present invention relates generally to images. More particularly, an embodiment of the present invention relates to encoding and decoding reversible production-quality reshaped video data that may, but is not limited to, be used in single-layer backward compatible and/or multi-layer backward compatible video coding.

BACKGROUND

As used herein, the term "dynamic range" (DR) may relate to a capability of the human visual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr), where each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. As appreciated by the inventors here, improved techniques for encoding and decoding reversible production-quality reshaped video data that can be used to support a wide variety of display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 4A and FIG. 4B illustrate example process flows; and

DESCRIPTION OF EXAMPLE EMBODIMENTS

Figure 1A:
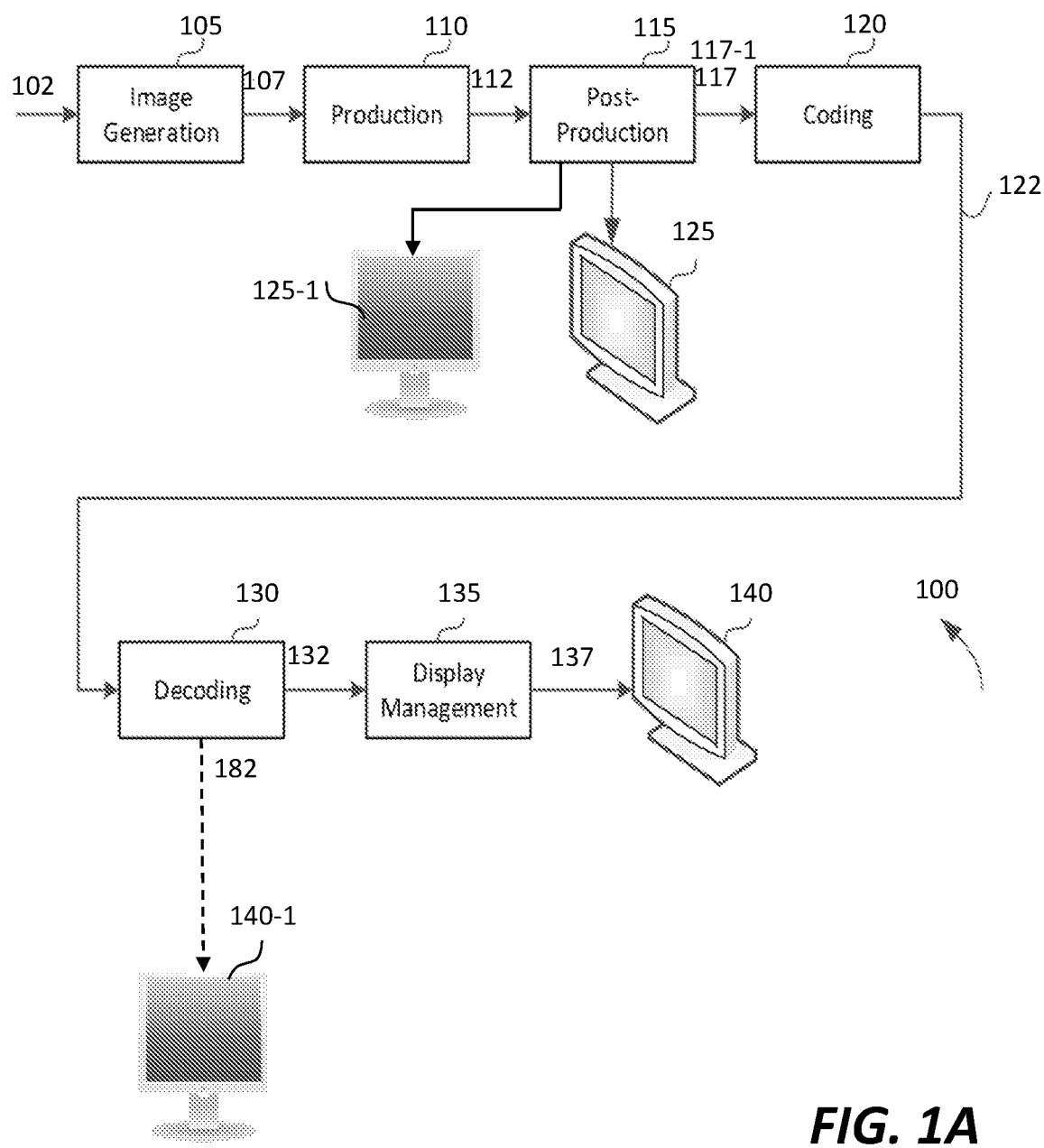
FIG. 1A depicts an example process for a video delivery pipeline.

Encoding and decoding reversible production-quality reshaped video data is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to encoding reversible production-quality reshaped video data. A plurality of luma histograms over a relatively narrow dynamic range is generated based at least in part on (a) a luma histogram over a high dynamic range and (b) a plurality of combinations of candidate parameter values for one or more luma mapping parameters. The luma histogram over the high dynamic range is generated based on one or more input images of the high dynamic range. Each luma histogram in the plurality of luma histograms over the relatively narrow dynamic range is generated based at least in part on the luma histogram over a high dynamic range and a respective combination of candidate parameter values in the plurality of combinations of candidate parameter values for the one or more luma mapping parameters. The plurality of luma histograms over the relatively narrow dynamic range is compared with a luma histogram of one or more reference tone-mapped images over the relatively narrow dynamic range. A specific combination of candidate parameter values is selected from among the plurality of combinations of candidate parameter values based on results of comparing the plurality of luma histograms with the luma histogram of the one or more reference tone-mapped images. A luma forward reshaping function with the one or more luma parameter values that are set to the specific combination of candidate parameter values is used to forward reshape luma components of the one or more input images into luma components of one or more forward reshaped images over the relatively narrow dynamic range. The one or more forward reshaped images are transmitted to one or more recipient devices.

Example embodiments described herein relate to decoding reversible production-quality reshaped video data. A luma backward reshaping function is constructed based on backward reshaping metadata received with one or more forward reshaped images of a relatively narrow dynamic range. The luma backward reshaped function represents an inverse of a luma forward reshaping function with one or more luma parameter values that are set to a specific combination of candidate parameter values. The luma backward reshaping function is applied to luma components of the one or more forward reshaped images to generate luma codewords of one or more reconstructed images of the high dynamic range that approximate one or more input images of the high dynamic range. The one or more reconstructed images are caused to be rendered with a display device.

Example Video Delivery Processing Pipeline

FIG. 1A depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor for post-production editing (115). Post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at post-production editing (115) to yield a high dynamic range version comprising input images (117) of a high dynamic range and a relatively narrow dynamic range version comprising reference tone-mapped images (117-1) of a relatively narrow dynamic range (e.g., SDR, etc.). The reference tone-mapped images may, but is not necessarily limited to only, be a non-reversible tone-mapped version of the input images of the high dynamic range. During post-production editing (115), the input images of the high dynamic range are viewed on a first reference display (125) that supports the high dynamic range by a colorist who is performing post-production editing operations on the input images of the high dynamic range. During post-production editing (115), the reference tone-mapped images of the relatively narrow dynamic range are viewed on a second reference display (125-1) that supports the relatively narrow dynamic range by the same or a different colorist who is performing post-production editing operations on the reference tone-mapped images of the relatively narrow dynamic range.

Following post-production editing (115), the input images (117) of the high dynamic range and the reference tone-mapped images (117-1) of the relatively narrow dynamic range are delivered to coding block (120) for generating forward reshaped images (e.g., 182 of FIG. 1C) to be included in a code bit stream (122). The code bit stream (122) is to be delivered downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate the coded bit stream (122). In some embodiments, the coded bit stream (122) is encoded with a compressed version of the forward reshaped images (182 of FIG. 1C) generated from forward reshaping the input images (117) of the high dynamic range. In some embodiments, the forward reshaped images (182) encoded in the coded bit stream (122), as generated in the coding block (120) by approximating the reference tone-mapped images (117-1), preserve the artistic intent with which the reference tone-mapped images are generated in the post-production editing (115). As the forward reshaped images (182) largely preserves the artistic intent, the forward reshaped images (182) may be encoded into video data in a video signal that is backward compatible with a wide variety of display devices (e.g., SDR displays, etc.) of the relatively narrow dynamic range. In an example, the video signal encoded with the forward reshaped images (182) may be a single-layer backward compatible video signal. In another example, the video signal encoded with the forward reshaped images (182) may be a multi-layer backward compatible video signal; for instance, the video signal encoded with the forward reshaped images (182) may represent a base-layer backward-compatible (component) video signal of the multi-layer video signal (e.g., a dual-layer video signal, etc.).

Additionally, optionally, or alternatively, the coded bit stream (122) is further encoded with image metadata including but not limited to backward reshaping metadata that can be used by downstream decoders to perform backward reshaping on the forward reshaped images (182) in order to generate backward reshaped images (e.g., 132 of FIG. 1D) identical to or approximating the input images (117) of the high dynamic range images. The reference tone-mapped images (117-1) may not be reversible in that the input images (117) of the high dynamic range may not be reconstructed or predicted by inversely mapping the reference tone-mapped images (117-1). For example, image details in the input images (117) represented by codewords of certain clipped ranges may be (e.g., entirely, etc.) clipped and lost in the reference tone-mapped images (117-1) as a part of producing the reference tone-mapped images (117-1) under the colorist's control. The reference tone-mapped images (117-1) are not reversible in the sense that the lost image details cannot be reconstructed/restored by inversely mapping the reference tone-mapped images (117-1). On the other hand, the forward reshaped images (182) are reversible in that the input images (117) of the high dynamic range may be reconstructed or predicted by inversely mapping the forward reshaped images (182) using backward reshaping. For example, image details in the input images (117) clipped and lost in the reference tone-mapped images (117-1) as a part of producing the reference tone-mapped images (117-1) under the colorist's control are not clipped and lost in the forward reshaped images (182). The forward reshaped images (182) are reversible in the sense that the image details lost in the reference tone-mapped images (117-1) can be (e.g., entirely, substantially, etc.) reconstructed/restored by inversely mapping the forward reshaped images (182).

In a receiver, the coded bit stream (122) is decoded by decoding block (130) to generate decoded images, which may be the same as the forward reshaped images (182) of the relatively narrow dynamic range (e.g., SDR, etc.). In some embodiments, the receiver may be attached to a first target display (140-1). In scenarios in which the first target display (140-1) supports the relatively narrow dynamic range, the forward reshaped images (182) that approximate the reference tone-mapped images edited with the artistic content are directly watchable on a first target display (140-1), which may be of similar characteristics as the second reference display (125-1). In some embodiments, the receiver may be attached to a second target display (140), which may or may not have completely different characteristics than the first reference display (125). In that case, the decoding block (130) may perform backward reshaping on the forward reshaped images (182) into backward reshaped images (e.g., 132 of FIG. 1D) that represent an identical version or a close approximation of the input images (117) of high dynamic range. Additionally, optionally, or alternatively, a display management block (135)—which may be in the receiver, in the target display (140), or in a separate device—further adjusts the backward reshaped images (132) to the characteristics of the second target display (140) by generating display-mapped signal (137) adapted to the characteristics of the second target display (140).

Signal Quantization

Some digital interfaces for video delivery, such as the Serial Digital Interface (SDI), are limited to 12 bits per pixel per component. Furthermore, some compression standards, such as H.264 (or AVC) and H.265 (or HEVC), are limited to 10-bits per pixel per component. Therefore efficient encoding and/or quantization is required to support HDR content, with dynamic range from approximately 0.001 to 10,000 $cd/m^2$ (or nits), within existing infrastructures and compression standards.

Techniques as described herein can be used to support any in a variety of PQ-based EOTFs, non-PQ-based EOTFs, color spaces, dynamic ranges, etc. The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An example of PQ mapping function (or EOTF) is described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model.

For example, under SMPTE ST 2084, at 1 $cd/m^2$, one 12-bit code value corresponds to a relative change of approximately 0.0048 $cd/m^2$; however, at 1,000 $cd/m^2$, one 12-bit code value corresponds to a relative change of approximately 2.24 $cd/m^2$. This non-linear quantization is needed to accommodate for the non-linear contrast sensitivity of the human visual system (HVS).

Another example of a perceptually-quantized EOTF is presented in "Chromaticity based color signals for wide color gamut and high dynamic range," by J. Stessen et al., ISO/IEC JTC1/SC29/WG11 MPEG2014/M35065 (October 2014), which is incorporated herein by reference in its entirety.

Contrast sensitivity of the HVS does not only depend on luminance but also on masking characteristics of the image content (most particularly noise and texture), as well as the adaptation state of the HVS. In other words, depending on the noise level or the texture characteristics of an image, image content can be quantized with larger quantization steps than those predicted by PQ or gamma quantizers, because texture and noise mask quantization artifacts. The PQ quantization describes the best the HVS can do, which occurs when there is no noise or masking in the image. However, for many images (frames) of a video, there is significant masking.

In addition to noise and texture masking, other characteristics of visual behavior, such as optical flare and local adaptation may also be taken into consideration to increase the level of quantization and allow representing HDR images at 10-bits or lower per color component. As used herein, the terms "Content-Adaptive PQ" or "Adaptive PQ" for short, denote methods to adaptively adjust the perceptual quantization of images based on their content.

Reshaped Signal Generation

Given a pair of corresponding high dynamic range and relatively narrow dynamic range images, that is, a pair of images that represent the same scene but at different levels of dynamic range, one image of the pair may be approximated in terms of the other image in the pair, in some or all channels of codewords in the images.

Figure 1B:
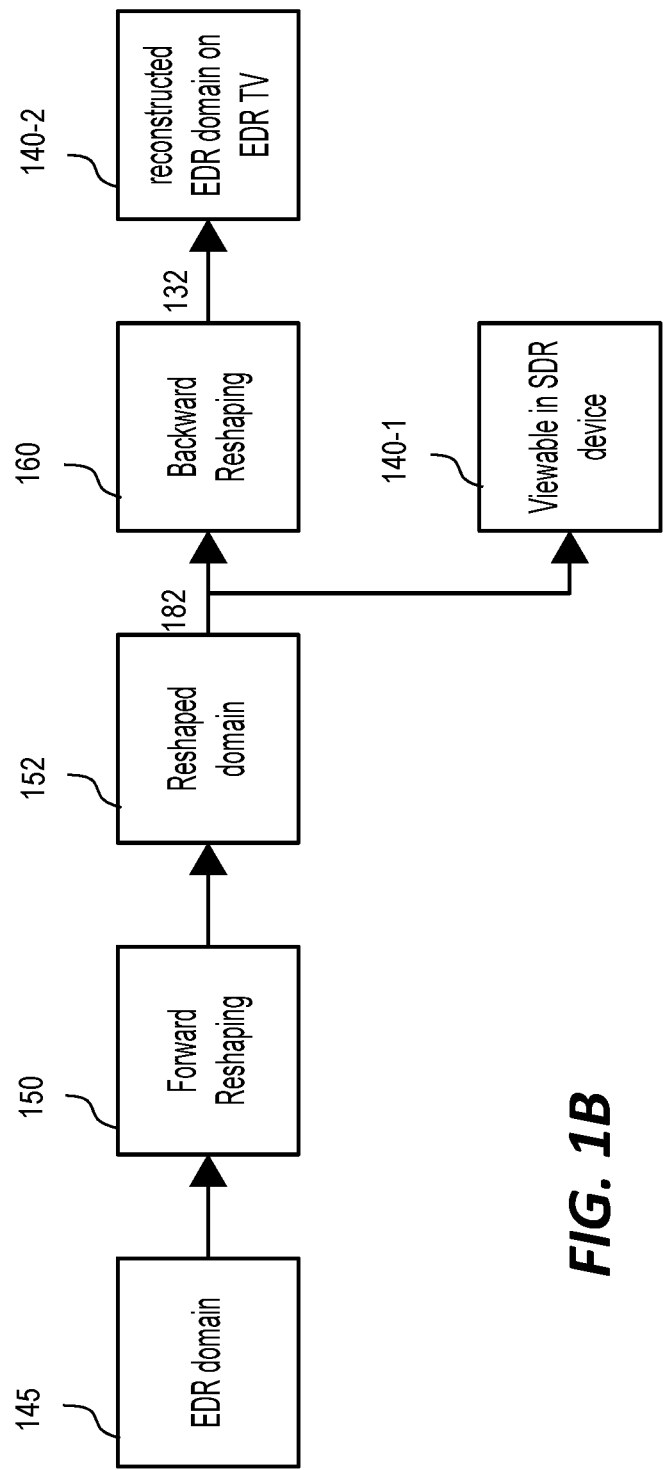
FIG. 1B depicts an example process for video data compression using content-adaptive quantization or reshaping.

FIG. 1B depicts an example process for generating a forward reshaped signal comprising forward reshaped images of a relatively narrow dynamic range (e.g., Rec. 709, etc.) and for reconstructing based on the forward reshaped signal and backward reshaping metadata therein images of a high dynamic range (e.g., Rec. 2020, EDR, IPTPQ (ICtCp), etc.).

As used herein, forward reshaped images decoded from a coded bit stream refer to reshaped images that approximate (e.g., with the same luma look, etc.) the reference tone-mapped images (117-1) that are generated with first specific artistic intent; the first specific artistic intent may be embodied in post-production editing (115) in which a colorist edits the reference tone-mapped images (117-1) while the colorist views the reference tone-mapped images on a second reference display 125-1 that supports the relatively narrow dynamic range.

As used herein, backward reshaped images (e.g., 132 of FIG. 1D) reconstructed from forward reshaped images and backward reshaping metadata decoded from a coded bit stream refer to reconstructed images that approximate the input images (117) that are generated with second artistic intent; the second specific artistic intent may be embodied in post-production editing (115) in which a colorist edits the input images (117) while the colorist views the input images (117) on a first reference display 125 that supports the high dynamic range.

By way of example but not limitation, the input images (117) after the post-production editing (115) may be represented in an EDR domain (e.g., 145, etc.) such as a Rec. 2020 YCbCr PQ domain, an IPTPQ (ICtCp) domain, Hybrid Log-Gamma (HLG) domain, etc. A forward reshaping block (150) analyzes the input images (117) in relation to the reference tone-mapped images (117-1) after the post-production editing (115). The forward reshaping block (150) generates optimized codeword mapping functions (or optimized forward reshaping functions) which map the input images (117) to optimized re-quantized images (or the forward reshaped images 182 of FIG. 1C) of the relatively narrow dynamic range (e.g., Rec. 709, SDR, HLG, etc.) in a reshaped domain (152). In some embodiments, the forward reshaped images (182) represented in the reshaped domain (152) are forward reshaped from the input images (117) in such a manner that the forward reshaped images (182) relatively closely resemble the reference tone-mapped images (117) visually to viewers of the forward reshaped images (182) and the reference tone-mapped images.

In some embodiments, information (e.g., backward reshaping metadata, etc.) about the reshaping process may be generated and communicated in the coding block (120) to downstream devices (such as decoders) with the forward reshaped images (182) in the coded bit stream (122). The decoding block (130) decodes the coded bit stream (122) into the decoded images, which are the forward reshaped images (182) in the reshaped domain (152) previously encoded into the coded bit stream (122) in the coding block (120).

In some embodiments, the forward reshaped images (182) can be directly rendered on a display device (140-1) that supports the relatively narrow dynamic range—which may be the same as that of the forward reshaped images (182) in the reshaped domain (152)—of the decoded images.

In some embodiments, the forward reshaped images (182) may be processed by a backward reshaping block (160), which converts the forward reshaped images (182) encoded in the coding block (120), into a reconstructed version that comprises reconstructed images (132) identical to or approximating the input images (117) in the EDR domain (145).

In some embodiments, the reconstructed images (132) can be rendered on a display device (140-2) that supports the high dynamic range—which may be the same as that of the input images (117) in the EDR domain (145)—of the reconstructed images.

In some embodiments, the reconstructed images (132) can be further processed with device-specific display management operations (e.g., performed by the display management process (135) discussed earlier, etc.); the further processed reconstructed images may be rendered on a display device that may or may not support the same dynamic range of the reconstructed images. In some embodiments, the backward reshaping block (160) may be integrated with a de-quantizer in decoding block (130), e.g., as part of the de-quantizer in an AVC or HEVC video decoder.

Encoder-Side Architecture

Figure 1C:
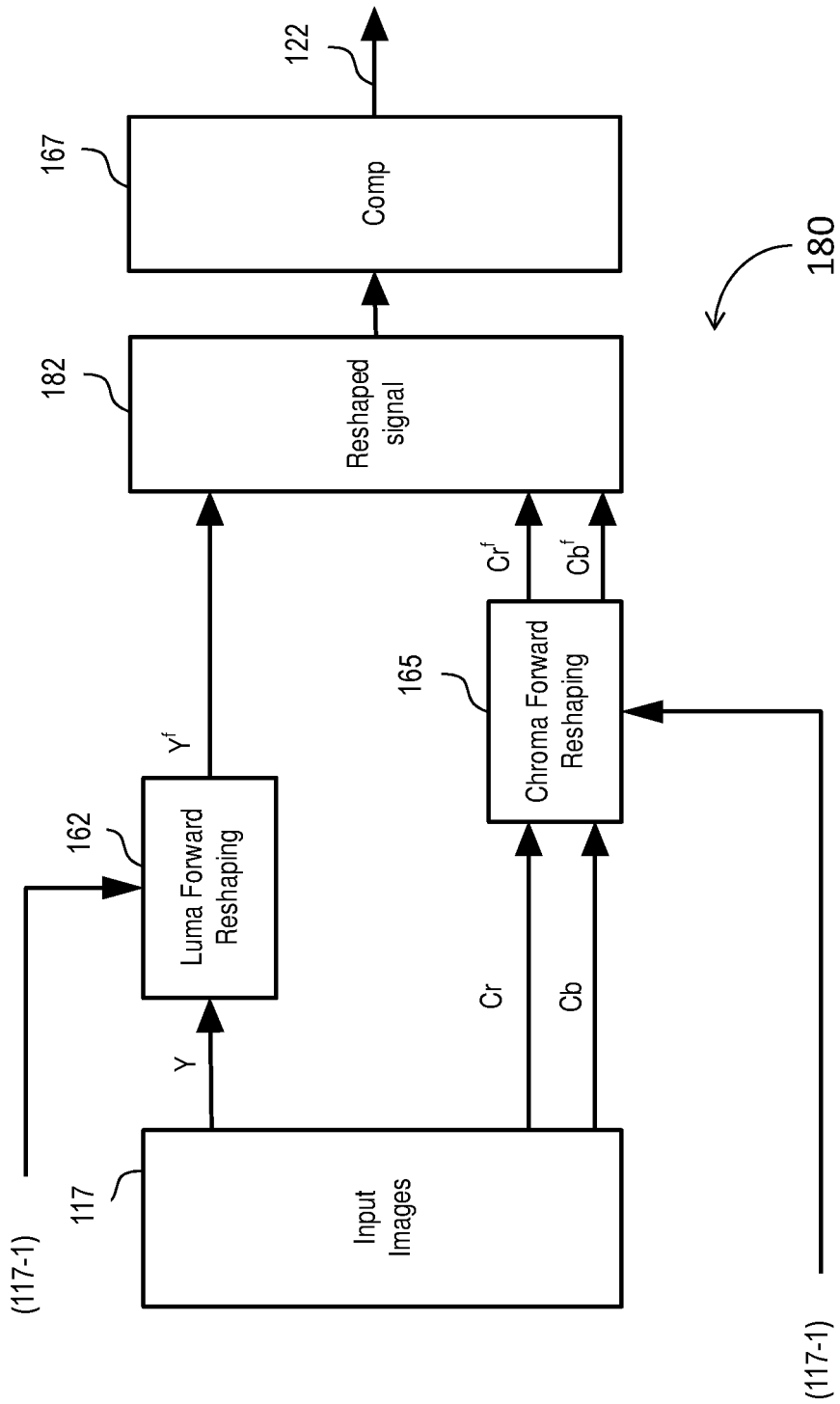
FIG. 1C and FIG. 1D depict example video encoder and decoder.

FIG. 1C illustrates example encoder-side codec architecture 180, which may be implemented with one or more computing processors in an upstream video encoder, etc.

The input images (117) of the high dynamic range after the post-production editing (115) may comprise, or may be further converted into, codewords in any of a variety of color spaces in any of a variety of sampling format. For the purpose of illustration only, the input images (117) are represented in the EDR domain (145) in a Rec. 2020 YCbCr PQ domain in a 4:2:0 sampling format, and comprise luma codewords (denoted as "Y" in a single luma channel) and chroma codewords (denoted as "Cr" and "Cb" in two chroma channels). It should be noted that Rec. 2020 YCbCr PQ domain represents only one of many possible choices for an input format/domain in which the input images (117) may be represented. Examples of possible choices of input formats/domains may include, but are not necessarily limited to only, any of: YCbCr-PQ in Rec. 2020, ICtCp color space, DCI P3, or other color formats/domains. The ICtCp color space and hybrid-log gamma (HLG) signal parameters are described in the ITU-R Report BT. 2390-0 (2016), "High dynamic range television for production and international programme exchange," which is incorporated herein by reference in its entirety.

The reference tone-mapped images (117-1) of the relatively narrow dynamic range after the post-production editing (115) may comprise, or may be further converted into, codewords in any of a variety of color spaces in any of a variety of sampling format. For the purpose of illustration only, the reference tone-mapped images (117-1) are represented in the reshaped domain 152) in an YCbCr color space (e.g., Rec. 709, P3, Rec. 2020, gamma-based, HLG-based, PQ-based, etc.) in a 4:2:0 sampling format, and comprise luma codewords (denoted as "Y" in a single luma channel) and chroma codewords (denoted as "Cb" and "Cr" in two chroma channels). It should be noted that YCbCr represents only one of many possible choices for a format/domain in which the reference tone-mapped images (117-1) may be represented. Examples of possible choices of formats/domains may include, but are not necessarily limited to only, any of: Rec. 709, YCbCr gamma, Rec. 709 HLG, P3 HLG, or other color formats/domains.

Forward reshaping as performed by the forward reshaping block (150) in generating the forward reshaped images (182) plays a relatively important role in ensuring that the input images of the high dynamic range (e.g., EDR, etc.) are efficiently compressed into the forward reshaped images (182) of the relatively narrow dynamic range (e.g., Rec. 709, SDR, etc.) in the reshaped domain (152), while at the same time ensuring that the forward reshaped images (182) are of the (e.g., near) production-quality that is directly viewable on a display device of the relatively narrow dynamic range. That way, the first specific artistic intent embodied in creating the reference tone-mapped images (117-1) after the post-production editing (115) is preserved relatively intact in the forward reshaped images (182) of the relatively narrow dynamic range.

In the meantime, the forward reshaping as performed by the forward reshaping block (150) should be reversible or invertible, thereby allowing the forward reshaped images (182) to be backward reshaped (or to be reshaped back) into backward reshaped images (e.g., 132 of FIG. 1D) of the high dynamic range (e.g., in the EDR domain, in an YCbCr-PQ domain, in an IPTPQ (ICtCp), etc.). The backward reshaped images (132) represent the reconstructed images (132) that are identical to, or relatively closely approximate, the input images (117) in the EDR domain (145). That way, the second specific artistic intent embodied in creating the input images (117) after the post-production editing (115) is also preserved relatively intact in the reconstructed images (132) of the high dynamic range.

In some embodiments, the forward reshaping block (150) comprises a luma forward reshaping block (162) to forward reshape the luma codewords (Y) of the input images (117) in the EDR domain (145) into forward reshaped luma codewords (denoted as "$Y^f$") of the forward reshaped images (182) in the reshaped domain (152) that approximate tone-mapped luma codewords of the reference tone-mapped images (117-1). The luma forward reshaping block (162) may be specifically configured to avoid banding artifacts and to improve compression efficiency.

In some embodiments, a method used by the luma forward reshaping block (162) to reshape luma codewords may make use of a (e.g., single-channel) luma forward reshaping function generated based on a histogram-based optimization algorithm.

Some examples of content-based quantization (CAQ) are described in PCT Application PCT/US2016/020230, filed on Mar. 1, 2016, entitled "Content-adaptive perceptual quantizer for high dynamic range images" by Jan Froehlich et al.; and PCT Application PCT/US2016/020232, filed on Mar. 1, 2016, entitled "Real-time content-adaptive perceptual quantizer for high dynamic range images" by Guan-Ming Su. The above-mentioned patent applications are hereby incorporated by reference as if fully set forth herein.

Additionally, optionally, or alternatively, since a color space and/or color gamut of a reference display (e.g., 125, etc.) used to edit the input images (117) of the high dynamic range in the post-production editing (115) is typically different from a color space and/or color gamut of another reference display (e.g., 125-1, etc.) used to edit the reference tone-mapped images (117-1) of the relatively narrow dynamic range in the post-production editing (115), the forward reshaping block (150) also needs to address the chroma reshaping issue.

In some embodiments, the forward reshaping block (150) comprises a chroma forward reshaping block (165) to forward reshape the chroma codewords (Cr and Cb). The chroma forward reshaping block (165) may implement a method to reshape chroma codeword (Cb and Cr) that is different from the (separate) single-channel method used by the luma forward reshaping block (162) to reshape luma codewords (Y).

In some embodiments, the method used by the chroma forward reshaping block (165) to reshape chroma codewords may be based on a multivariate multi-regression (MMR)-based algorithm that supports multiple-channel (or cross-channel) reshaping. The chroma forward reshaping block (165) receives the chroma codewords (Cr and Cb) of the input images (117), the chroma codewords (Cr and Cb) of the reference tone-mapped images (117-1), and downsampled luma codewords of the input images (117), as input. The input as received by the chroma forward reshaping block (165) may be mapped by the chroma forward reshaping block (165) into forward reshaped chroma codewords (denoted as "$Cr^f$" and "$Cb^f$") of the forward reshaped images (182) in the reshaped domain (15). Some examples of MMR-based chroma reshaping are described in U.S. Provisional Application No. 62/312,450 (or the '450 application), filed on Mar. 23, 2016, entitled "Encoding and Decoding Reversible Production-Quality Single-Layer Video Signals" by Guan-Ming Su et al.

Figure 1D:
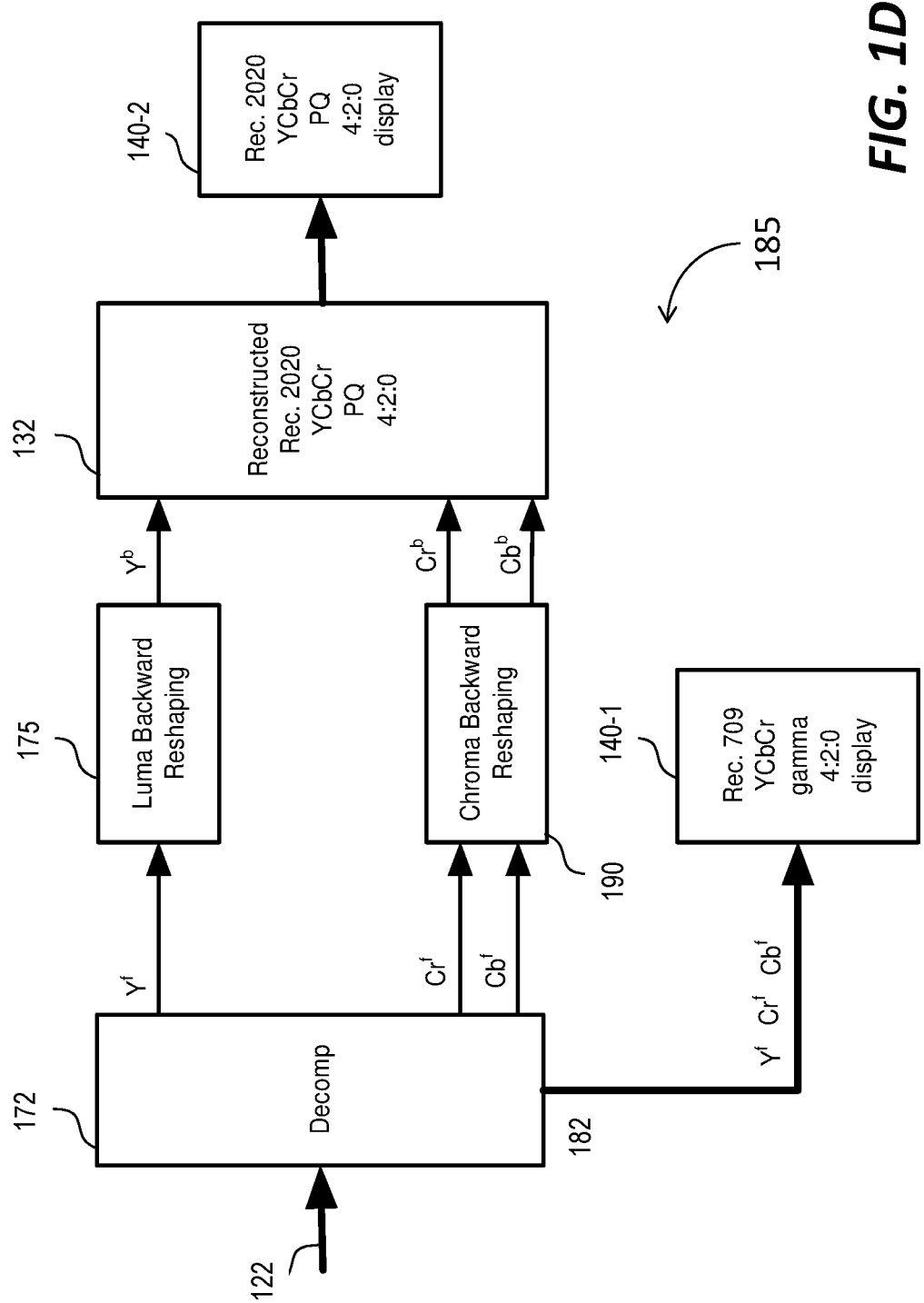

In some embodiments, the forward reshaping block (150) is configured to generate a (e.g., single-channel) luma backward reshaping function that can be delivered with the forward reshaped images (182) to a downstream video decoder as illustrated in FIG. 1D. The luma backward reshaping function may be used by the video decoder to backward reshape luma codewords of the forward reshaped images (182) into luma codewords of backward reshaped images (e.g., 132 of FIG. 1D, etc.).

In some embodiments, the forward reshaping block (150) comprises a chroma backward reshaping mapping generator (170)—which is to use the chroma codewords (Cr and Cb) of the input images (117), the forward reshaped chroma codewords ($Cr^f$ and $Cb^f$) of the forward-reshaped images (182), and downsampled forward reshaped luma codewords generated by downsampling the forward reshaped luma codewords ($Y^f$) of the forward-reshaped images (117), as input, to generate a chroma backward reshaping mapping that can be delivered with the forward reshaped images (182) and the luma backward reshaping function to a downstream video decoder as illustrated in FIG. 1D. The chroma backward reshaping mapping may be used by the video decoder to backward reshape chroma codewords of the forward reshaped images (182) into chroma codewords of backward reshaped images (e.g., 132 of FIG. 1D, etc.).

In some embodiments, operational parameters defining/specifying the luma backward reshaping function and the chroma backward reshaping mapping may be included as backward mapping metadata in image metadata to be encoded with the forward reshaped images (182) by a compressor (167) into the coded bit stream (122).

Decoder-Side Architecture

FIG. 1D illustrates example decoder-side codec architecture 185, which may be implemented with one or more computing processors in a downstream video decoder, etc.

The coded bit stream (122) may be decoded by a decompressor 172 into the decoded images, which may be the same as or similar to the forward reshaped images (182) subject to coding errors, quantization errors, etc., introduced in compression/decompression processes and comprise the luma forward reshaped codewords ($Y^f$) and the chroma forward reshaped codeword ($Cr^f$ and $Cb^f$).

In some embodiments, the forward reshaped images (182) with little or no changes can be directly rendered on a display device such as the first target display (140-1) that supports the relatively narrow dynamic range. As the forward reshaped images (182) are generated to relatively closely approximate the reference tone-mapped images (117-1) after the post-production editing (115), the forward reshaped images (182) are expected to preserve to the specific artistic intent embodied in creating the reference tone-mapped images (117-1).

Additionally, optionally, or alternatively, the forward reshaped images (182) of the relatively narrow dynamic range, as decoded from the coded bit stream (122), may be further backward reshaped into the backward reshaped images (132) of the high dynamic range. For example, a luma backward reshaping block 175 may be configured to apply the luma backward reshaping function as defined/specified in the backward reshaping metadata that is carried with the encoded forward reshaped images in the coded bit stream (122) to the luma forward reshaped codewords ($Y^f$) as input to generate luma backward reshaped codewords ($Y^b$) of the backward reshaped images (132) as output.

Further, a chroma backward reshaping block 190 may be configured to apply the chroma backward reshaping mapping as defined/specified in the backward reshaping metadata that is carried with the encoded forward reshaped images in the coded bit stream (122) to the chroma forward reshaped codewords ($Cr^f$ and $Cb^f$) and downsampled luma forward reshaped codewords generated by downsampling the luma forward reshaped codewords ($Y^f$) as input to generate chroma backward reshaped codewords ($Cr^b$ and $Cb^b$) of the backward reshaped images (132) as output. It should be noted that YCbCr-PQ in Rec. 2020 represents only one of many possible choices for an output format/domain in which the reconstructed images (132) may be represented. Examples of possible choices of output formats/domains may include, but are not necessarily limited to only, any of: YCbCr-PQ in Rec. 2020, IPTPQ (ICtCp), DCI P3, or other color formats/domains. It should also be noted that the reconstructed images (132) may be further transformed into an output format/domain that may or may not be the same as an input format/domain in which the input images (117) are represented.

In some embodiments, the backward reshaped images (132) with little or no changes can be directly rendered on a display device such as the display device (140-2) that supports the high dynamic range. As the backward reshaped images (132) are generated to be identical or relatively closely approximate the input images (117) after the post-production editing (115), the backward reshaped images (132) are expected to preserve to the specific artistic intent embodied in creating the input images (117).

Optimizing Luma Forward Reshaping for Reversibility and Artistic Intent Preservation Input images (e.g., 117, an EDR video signal, etc.) of a high dynamic range can be forward reshaped to forward reshaped images (e.g., 182, a "second grade" in block 204, an SDR video signal, etc.) of a relatively narrow dynamic range.

In some embodiments, forward reshaping operations that forward reshape the input images (117) into the forward reshaped images comprises (1) luma forward reshaping operations that forward reshape luma codewords of the input images (117) to luma codewords of the forward reshaping images, and (2) chroma forward reshaping operations that forward reshape chroma codewords of the input images (117) to chroma codewords of the forward reshaped images.

In some embodiments, the luma forward reshaping operations are based at least in part on a luma forward reshaping function, whereas the chroma forward reshaping operations are based at least in part on a chroma forward reshaping mapping. The luma forward reshaping function and/or the chroma forward reshaping mapping may be adjustable by adjusting luma mapping parameters and/or chroma mapping parameters to different parameter values.

Example luma mapping parameters may include, but are not necessarily limited to only, any of: Lift/Gain/Gamma (LGG), Slope/Offset/Power (SOP), etc. Luma mapping parameters as described herein may be employed to adjust the luma forward reshaping function (or luma forward reshaping curve) in a range of luma codewords globally or locally. In some embodiments, the entire range of luma codewords as represented in the input images (117) may be logically divided into multiple regions such as highlight regions, dark regions, mid-tone regions, other regions, etc. The luma mapping parameters may be varied among different combinations of parameter values for the purpose of generating different numbers, different densities, etc., of codewords available in these regions in the entire range of luma codewords.

Example chroma mapping parameters may include, but are not necessarily limited to only, any of: scaling factors, mapping control parameters, etc. Chroma mapping parameters as described herein may be employed to adjust the chroma forward reshaping mapping globally or locally. For example, the chroma mapping parameters may be varied in one or more value ranges for the purpose of controlling distortions, color saturations, etc., in the forward reshaped images.

Figure 2A:
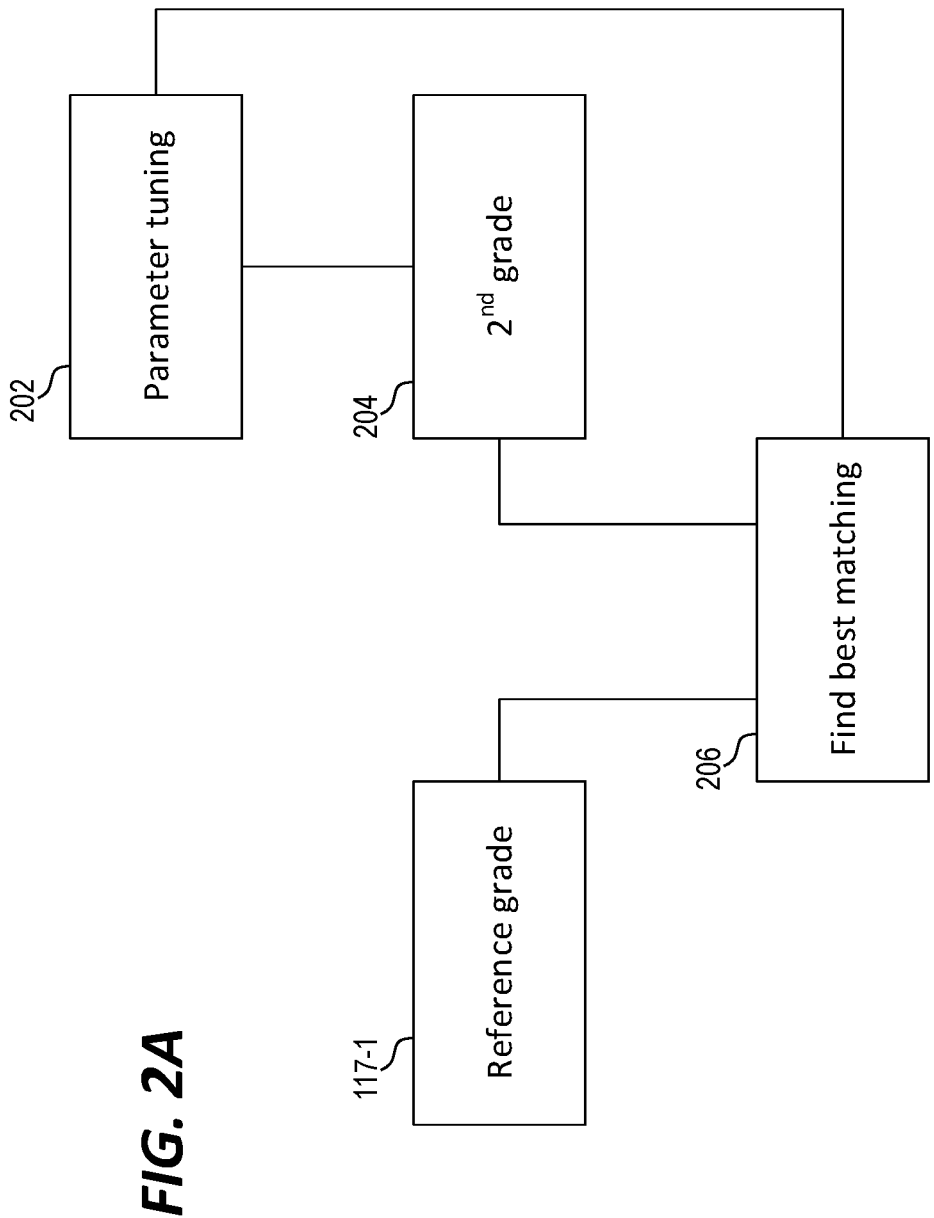
FIG. 2A and FIG. 2C depict example luma look matching processes.

By way of example but not limitation, FIG. 2A illustrates an example luma-look matching process in which optimized parameter values for luma mapping parameters are determined for forward reshaping luma codewords of the input images (117) to luma codewords of optimized forward reshaped images (182). Luma-look matching of FIG. 2A may be performed by one or more computing devices (e.g., coding block (120), luma forward reshaping block (162), etc.) on a frame basis, a Group of Pictures (GOP) basis, a scene basis, a multi-scene basis, etc. In some embodiments, a process similar to, or operating in conjunction with, that of FIG. 2A may also be performed to determine/select optimized parameter values for chroma mapping parameters by one or more computing devices (e.g., coding block (120), luma forward reshaping block (162), etc.) on a frame basis, a Group of Pictures (GOP) basis, a scene basis, a multi-scene basis, etc.

In block 202, each, some, or all of the luma mapping parameters may be tuned to different possible parameter values. In some embodiments, a parameter value range for a luma mapping parameter may be discretized into a set of different discrete values. The luma mapping parameters may be set, varied or iterated through a plurality of combinations of candidate mapping parameter values.

In block 204, the luma mapping parameters as defined/specified by the plurality of combinations of candidate mapping parameter values (which are tuned or varied in block 202) may be used to define or specify a plurality of candidate luma forward reshaping functions. Each candidate luma forward reshaping function in the plurality of candidate luma forward reshaping functions may be defined or specified by a respective combination of candidate mapping parameter values in the plurality of combination of candidate mapping parameter values (which are tuned or varied in block 202).

Luma-look characteristics are determined for a plurality of sets of candidate forward reshaped images (denoted as "second grade" in FIG. 2A) that comprise candidate luma codewords forward reshaped from luma codewords of the input images (117) based on the plurality of candidate luma forward reshaping functions. Each set of candidate forward reshaped images in the plurality of sets of candidate forward reshaped images comprises candidate luma codewords forward reshaped from luma codewords of the input images (117) based on a respective candidate luma forward reshaping function in the plurality of candidate luma forward reshaping functions.

In block 206, the luma-look characteristics for the plurality of sets of candidate reshaped images ("second grade") may be compared with luma-look characteristics of the reference tone-mapped images (117-1), which is denoted as a "reference grade" in FIG. 2A. A specific candidate luma forward reshaping function may be selected/determined among the plurality of candidate luma forward reshaping functions as an optimized luma forward reshaping function, based on results of comparing the luma-look characteristics for the plurality of sets of candidate reshaped images ("second grade") and the luma-look characteristics of the reference tone-mapped images (117-1).

For example, the specific candidate luma forward reshaping function may be used to generate luma codewords of a specific set of candidate reshaped images in the plurality of sets of candidate reshaped images ("second grade"). Luma-look characteristics of the specific set of candidate reshaped images may be determined to be the closest to the luma-look characteristics of the reference tone-mapped images (117-1 "reference grade").

It should be noted that the luma-look matching process of FIG. 2A can be performed without actually generating full-fledge candidate forward reshaped images so long as the luma-look characteristics of the candidate forward reshaped images based on the candidate luma forward reshaping functions can be determined.

In some embodiments, after being determined in the luma-look matching process of FIG. 2A, the optimized luma forward reshaping function can be used to generate the optimized forward reshaped images (182) with similar luma look as compared with the reference tone-mapped images (117-1), while maintaining the reversibility of the optimized forward reshaped images (182).

The optimized forward reshaped images (182) are reversible in that the optimized forward reshaped images (182) can be inversely mapped back to reconstructed images of the high dynamic range that are (e.g., completely, substantially, within quantization errors, etc.) approximate the input images (117). For example, the optimized forward reshaped images (182) may be free of or may be of minimal clipped codeword regions. Furthermore, the optimized forward reshaped images (182) are generated based on the optimized luma forward reshaping function and thus match as closely as possible with the luma look(s) of the reference tone-mapped images (117-1) that are generated with a colorist's artistic intent.

As an example application, techniques as described herein can be incorporated in single-layer backward compatible codecs as well as multi-layer backward compatible codecs to provide support for backward compatibility (BC). For example, the reference tone-mapped images (117-1) may be created to support back compatibility, or to be rendered on a wide variety of display devices (e.g., SDR displays, etc.) of the relatively narrow dynamic range. The reference tone-mapped images (117-1) may be generated through content mapping (CM) operations controlled by a colorist. The CM operations under the colorist may include, but are not necessarily limited to, any of: trim pass operations, the colorist's image manipulations, adjustments made with a different color space, etc.

In some embodiments, the reference tone-mapped images (117-1) comprise clipped codeword regions in which image details have been removed or significantly reduced in one or more of highlight regions, dark regions, etc., because of the trim pass operations, the colorist's image manipulations, the adjustments made with the different color space, etc. As a result, it is not feasible or efficient for a video decoder to reconstruct images of the high dynamic range based on the reference tone-mapped images (117-1) with clipped codeword regions, even if the reference tone-mapped images (117-1) were delivered in the coded bitstream (122) to the video decoder.

In contrast, under techniques as described herein, instead of the reference tone-mapped images (117-1), the optimized forward reshaped images (182) as generated based on the optimized luma forward reshaping function, can be encoded in the code bitstream (122) and provided to downstream video decoders. Since the optimized forward reshaped images (182) have the same or similar luma look(s) of the reference tone-mapped images (117-1), the colorist's artistic intent in creating the reference tone-mapped images (117-1) is entirely or substantially preserved in the optimized forward reshaped images (182). At the same time, the optimized forward reshaped images (182) are entirely or substantially free of clipping relative to the reference tone-mapped images (117-1). Thus, the optimized forward reshaped images (182) can be used to generate high quality reconstructed images of the high dynamic range that closely approximate the input images (117).

Furthermore, in operational scenarios in which the optimized forward reshaped images (182) are carried in a base layer of a multi-layer video signal, the amount of image residue data to be carried in other layers such as enhancement layers of the multi-layer video signal can be much reduced. Multi-layer encoding (e.g., enhancement-layer encoding) can be much less complicated with the optimized forward reshaped images (182) in the base layer than with the reference tone-mapped images (117-1) in the base layer.

Example Forward Reshaping Functions

Figure 2B:
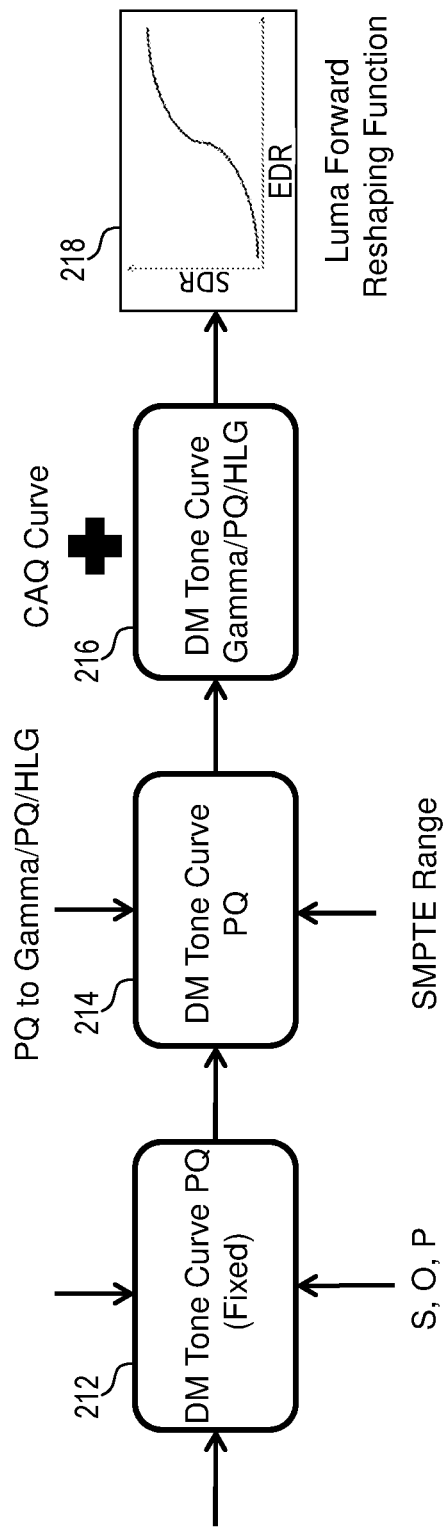
FIG. 2B depicts an example luma forward reshaping function.

FIG. 2B illustrates an example process to generate a luma forward reshaping function 218 (e.g., a candidate luma forward reshaping function, etc.) based on combining a number of mapping functions (or relationships).

Denote a luma component of the $i^{th}$ pixel of the $j^{th}$ input image (e.g., one of the input images (117), an EDR picture, etc.) as $v_{ji}$, and a luma component of the $i^{th}$ pixel of the $j^{th}$ reference tone-mapped image (e.g., one of the reference tone-mapped images (117-1), an SDR picture, etc.) as $s_{ji}$.

As illustrated in FIG. 2B, the mapping functions used to derive the luma forward reshaping function (218) may include a tone mapping function T(·) (denoted as "DM Tone Curve PQ (Fixed)" in FIG. 2B or 212 of FIG. 2B) in a PQ domain. A luma component $\tilde{y}_{ji}$ of the $i^{th}$ pixel of the $j^{th}$ frame (e.g., a tone mapped image, etc.) in the PQ domain as tone mapped from the luma component $v_{ji}$ of the $i^{th}$ pixel of the $j^{th}$ input image based on the tone mapping relationship T(·) may be given as follows:

$$\tilde{y}_{ji} = T(v_{ji}) \quad (1)$$

In some embodiments, the tone mapping function T(·) may be tuned or varied by incorporating a tone mapping modification function $f(\cdot)$ with luma mapping parameters t into a modified tone mapping function 214 (denoted as "DM Tone Curve PQ" in FIG. 2B). Example tone mapping modification functions may include, but are not necessarily limited to only, any of: sigmoid curves, gamma curves, analytical curves, non-analytical curves, power functions, S-curves, etc.

The tone mapping modification function $f(\cdot)$ and/or the luma mapping parameters t may be tuned or varied on a frame basis, a Group of Pictures (GOP) basis, a scene basis, a multi-scene basis, etc. By way of example but not limitation, in some embodiments, the luma mapping parameters used in the tone mapping modification function $f(\cdot)$ to tune or vary the tone mapping function T(·) may, but are not necessarily limited to only, be SOP parameters. In these embodiments, t=[slope offset power]. The tone mapping modification function $f(\cdot, \cdot)$ and the luma mapping parameters t can be applied on top of $\tilde{y}_{ji}$, to derive a modified luma component $\hat{y}_{ji}^t$ as follows:

$$\hat{y}_{ji}^t = f(\tilde{y}_{ji}, t) \quad (2)$$

Thus, the modified luma component $\hat{y}_{ji}^t$, is essentially derived based on the modified tone mapping function 214 (denoted as "DM Tone Curve PQ" in FIG. 2B) that combines the tone mapping relationship T(·) and the tone mapping modification function $f(\cdot, \cdot)$.

The modified luma component $\hat{y}_{ji}^t$ can be converted to a luma component $y_{ji}^t$, for a target display such as the second reference display (125-1) based on an EOTF (denoted as g(·)) specific to the target display. The target display may be associated with one of: Rec. 709, YCbCr gamma, Rec. 709 HLG, P3 HLG, or other color formats/domains. The EOTF g(·) may represent a dynamic range transformation that compress a (e.g., full, a relatively large, etc.) dynamic range capable of being perceived by the HVS to an SMPTE range. The luma component $y_{ji}^t$, for the second reference display (125-1) may be converted from the modified luma component $\hat{y}_{ji}^t$ based on the EOTF g(·) as follows:

$$y_{ji}^t = g(\hat{y}_{ji}^t) \quad (3)$$

The luma component $y_{ji}^t$ may be represented as an integer between $[0 \ 2^{BL\_bit\_depth} - 1]$. Thus, the luma component $y_{ji}^t$ is essentially derived based on a second modified tone mapping function 216 (denoted as "DM Tone Curve Gamma/PQ/HLG" in FIG. 2B) that combines the tone mapping relationship T(·), the tone mapping modification function $f(\cdot, \cdot)$, and the EOTF g(·).

In some embodiments, a CAQ curve comprising bit depths computed based on noise measurements of the $j^{th}$ input image of the high dynamic range may be combined with the second modified tone mapping function (216) to generate the luma forward reshaping function (218). In codeword regions in which bin depths of the CAQ curves are greater than bin depths represented by the second modified tone mapping function (216), which indicates a possibility for banding artifacts in a forward reshaped image generated by the second modified tone mapping function (216), the bit depths from the CAQ curve may be used in place of the bit depths represented by the second modified tone mapping function (216) for the purpose of generating the luminance forward reshaping function (218). Some examples of combining bit depths of a CAQ curve are described in the '450 application.

Given the luma forward reshaping function (218) with the luma mapping parameters t, a desired goal is to adjust parameter values of t so that the luma component $\{y_{ji}^t\}$ generated by the luma forward reshaping curve (28) can have as similar look as the luma component $\{s_{ji}\}$ of the reference tone-mapped images (117-1).

As illustrated in TABLE 1, an approach for identifying an optimized luma forward reshaping function is as follows: (1) applying the luma forward reshaping function (218) with the luma mapping parameters t to map the luma component $v_{ji}$ of every pixel of the $j^{th}$ input image (e.g., one of the input images (117), an EDR picture, etc.) into the luma component $\{y_{ji}^t\}$ of every pixel of the $j^{th}$ mapped image, (2) calculating a distance/similarity based on differences between the luma component $\{s_{ji}\}$ of the reference tone-mapped images (117-1) and the luma component $\{y_{ji}^t\}$ of every pixel of the $j^{th}$ mapped image, (3) repeating the foregoing steps (1) and (2) for all possible combinations of candidate parameter values of the luma mapping parameters t, and (4) selecting the best parameter values for the luma mapping parameters t, where the best parameter values correspond to the minimum of the distance or the maximum of the similarity based on differences between the luma component of the reference tone-mapped images (117-1) and the luma component $\{y_{ji}^t\}$ of every pixel of the $j^{th}$ mapped image.

The luma forward reshaping function (218) with the best parameter values for t are then chosen to be the optimized luma forward reshaping function to forward reshape the $i^{th}$ input image into the $j^{th}$ forward reshaped image.

TABLE 1

// STEP 1: perform tone mapping, display management
//          operations, etc. (e.g., in PQ domain)
for each pixel $v_{ji}$
    $\tilde{y}_{ji} = T(v_{ji})$
end
for all considered SOP parameter t
    // perform SOP adjustment and measure similarity
    for each pixel $v_{ji}$
        $y_{ji}^t = g(f(\tilde{y}_{ji}, t))$
    End
    // STEP 2: calculate similarity based on pixel for different SOP
    Calculate the distance/similarity between $\{y_{ji}^t\}$ and $\{s_{ji}\}$
    // STEP 3: repeat for all possible combinations of candidate parameter
    values for t
End
// STEP 4: pick the best parameter values for t
Choose the best parameter values for t which has the best distance/similarity to forward reshape the $j^{th}$ input image.

However, this approach can be very time consuming as comparisons of luma components are performed for every pixel. Furthermore, distance/similarity measurement can be based on mean-squared-error (MSE) or other metrics that require time consuming computations. While the function g(f( )) can be built as 1-D LUT to cover an entire EDR video signal input, $2^{EDR\_bit\_depth}$ entries may be required. Assuming L different combinations of candidate parameter values for the luma mapping parameters (e.g., SOP, etc.) and P pixels, computational complexity for building the 1-D LUT in this approach is estimated to be $O(L*2^{EDR\_bit\_depth})$, and computational complexity for measuring distance/similarity in this approach is estimated to be O(PL). Thus, this approach has relatively high computational complexity.

In some embodiments, techniques as described herein provide an efficient way (e.g., in terms of computational efficiency, coding efficiency, etc.) to search optimal (e.g., the best, etc.) parameter values for luma mapping parameters (e.g., SOP, LGG, etc.) that can be used to generate the optimized forward reshaped images (182) that have the closest luma look to that of the reference tone-mapped images (117-1). The optimal parameter values for the luma mapping parameters can be selected from among all different combinations of candidate parameter values such that the optimal parameter values correspond to a specific combination of parameter values with the best score in the distance/similarity measurement among scores in the distance/similarity measurements for the different combinations of candidate parameter values.

Under techniques as described herein, luma-look characteristics of an image, a GOP, a scene, multiple scenes, etc., may be represented a luma histogram of the image, the GOP, the scene, the multiple scenes, etc. As used herein, the term "luma histogram" refers to a histogram that is built based on a distribution of luma components of an image, a GOP, a scene, multiple scenes, etc.

One way to determine whether luma looks of a first image (e.g., a mapped image, an optimized forward reshaped image, etc.) and a second image (e.g., a reference tone-mapped image, etc.)—both of which may be of the same dynamic range (e.g., the relatively narrow dynamic range, etc.)—are similar is to determine whether luma histograms of the first image and the second image are similar. In other words, similar luma looks of the images can be measured or represented by similar luma value distributions (or similar pixel counts over a common or substantially overlapping luma codeword range) as captured by the luma histograms of the images. For example, multiple luma codeword regions having similar pixel counts of the images results in similar luma looks of the images. Note that it could be rather difficult to have a perfect match of luma looks at either pixel level or histogram level, as operations generating the reference tone-mapped images (117-1) are different from (or not identical to) operations generating the mapped images with the luma forward reshaping function with a given combination of parameter values for the luma mapping parameters. Some colorist trim pass operations may have been applied in generating the reference tone-mapped images (117-1) to clip highlight regions, dark areas, etc. These operations make perfect matching of luma looks at pixel level or histogram level difficult if not at all impossible. Thus, a goal for techniques as described herein is to make the optimized forward reshaped image and the corresponding reference tone-mapped image to have similar luma looks as defined by similar luma histograms.

For example, a score in the distance/similarity measurement between a mapped image and the reference tone-mapped image (e.g., one of the reference tone-mapped images (117-1), etc.) may be computed based on a comparison of a luma histogram of the mapped image and a luma histogram of the reference tone-mapped image. The luma mapping parameters with the optimal parameter values as determined based on the luma histograms may be used to generate an optimized luma forward reshaping function that forward reshapes the reference tone-mapped image into an optimized forward reshaped image.

In some embodiments, regardless of whether the reference tone-mapped image is a heavy trim pass picture, the optimized forward reshaped image generated under techniques as described herein preserves image details for reversibility, while maintaining the colorist's artistic intent expressed in the reference tone-mapped image.

A luma histogram of the mapped image might be obtained by applying to the luma components $\{v_{ji}\}$ of the input image all operations, T(·), f(·, t), and g(·) to obtain the luma components $\{y_{ji}'\}$ of the mapped image and then building the luma histogram of the mapped image based on the luma components $\{y_{ji}'\}$. However, this approach of building the luma histogram of the mapped image could be computation intensive.

Figure 2C:
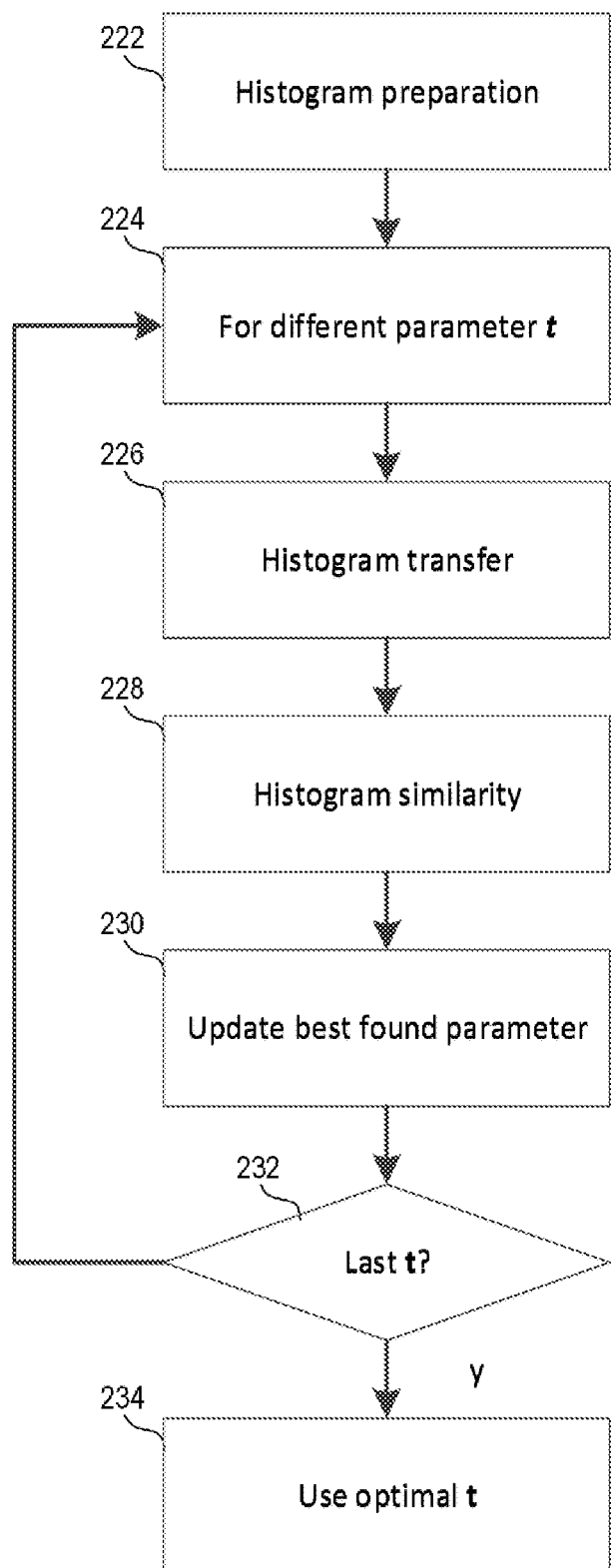

Under techniques as described herein, in order to make a histogram-based luma-look matching process (e.g., as shown in FIG. 2A or FIG. 2C, etc.) efficient, the histogram-based luma-look matching process may be divided into three major steps: (1) histogram preparation: prepare a first histogram of an input image (e.g., one of the input images (117), etc.) of the high dynamic range and a second histogram of a reference tone-mapped image (e.g., one of the reference tone-mapped images (117-1), etc.) of the relatively narrow dynamic range that corresponds to the input image of the high dynamic range, (2) histogram transfer: instead of calculating a histogram of a mapped image based on mapped pixel values of the mapped image, convert the first histogram via the luma forward reshaping function (218) with a combination of candidate parameter values for the luma mapping parameters (e.g., SOP, LGG, etc.) to a mapped luma histogram, and (3) histogram matching: search the best luma-look match between the second histogram of reference tone-mapped image and the mapped luma histogram among a plurality of mapped luma histograms corresponding to different combinations of candidate parameter values for the luma mapping parameters.

In some embodiments, the three major steps of histogram preparation, histogram transfer and histogram matching as enumerated above may be carried in a series of detailed steps as follows.

Figure 3A:
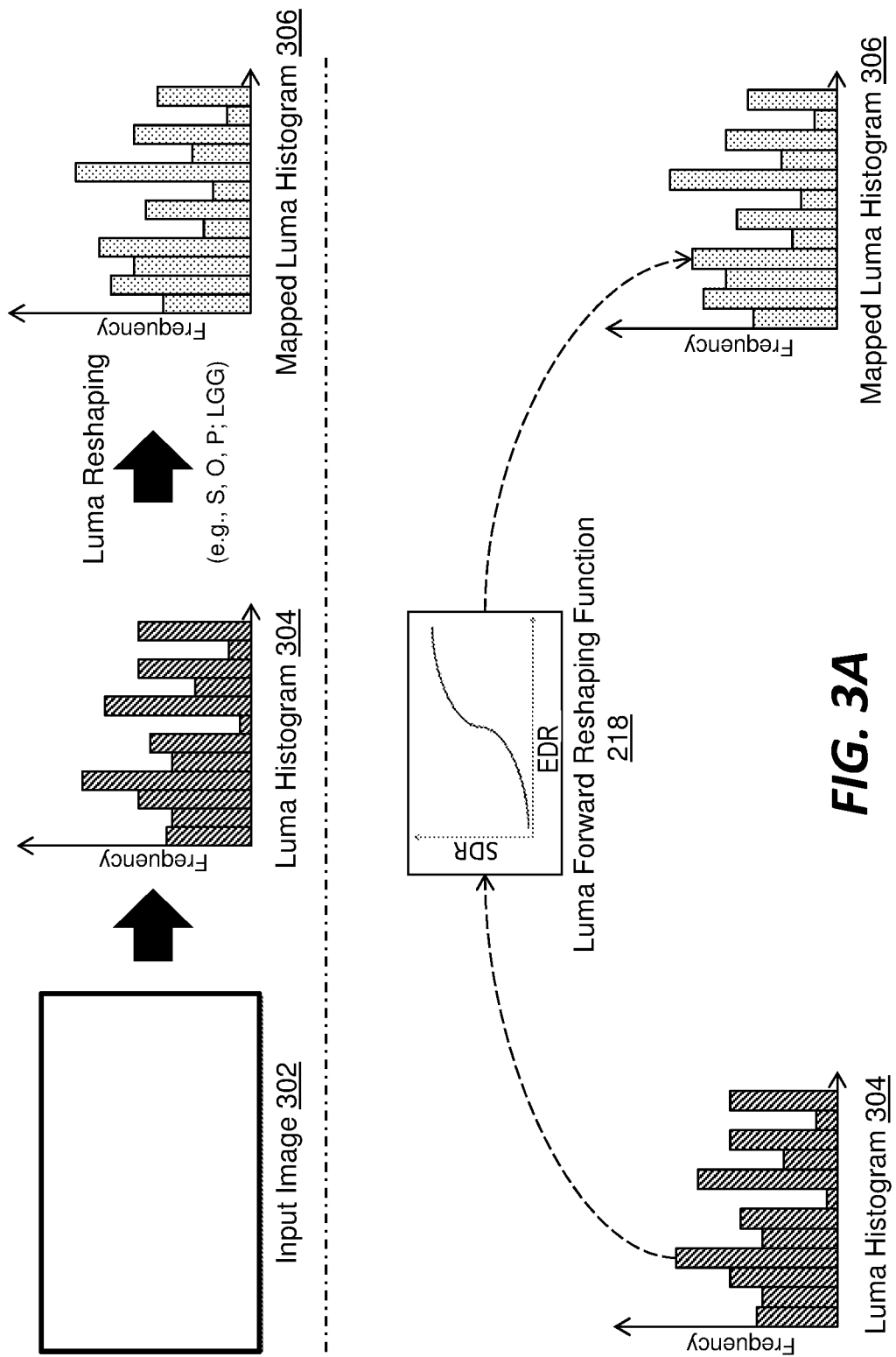
FIG. 3A illustrates example luma histograms that are related to each other through an example luma forward reshaping function.

In Step 1 of the histogram-based luma look matching process, valid spatial regions may be established/identified in the reference tone-mapped image and the input image (e.g., 302 of FIG. 3A, etc.) by excluding certain spatial regions such as letterbox areas from the reference tone-mapped image and the input image (302). The valid spatial regions of the reference tone-mapped image and the input image (302) may be used in place of the reference tone-mapped image and the input image (302) to avoid matching between potentially numerous black pixels.

In Step 2 of the histogram-based luma look matching process, a luma histogram of the reference tone-mapped image is prepared or built based on the luma components $\{s_{ji}\}$ of the reference tone-mapped image.

Assume there are N codeword bins for the relatively narrow dynamic range of the reference tone-mapped images (117-1). In some embodiments, N can be as large as the total number of codewords available in the relatively narrow dynamic range (e.g., 1024 for a 10-bit base layer codeword space, etc.). However, for the purpose of further reducing computation complexity in the histogram-based luma look matching process, N can be set to a much smaller value (e.g., 256, a fraction of the total number of codewords available in the relatively narrow dynamic range, etc.) by trading off some accuracy. All pixels in the reference tone-mapped image that have luma components $s_{ji}$ with values falling between $$\left[\frac{n}{N}, \frac{n+1}{N}\right)$$

form a set $\Phi_n$ and are counted in a pixel count $h_n^s$ represented in the $n^{th}$ bin, where n=0, 1, ..., N−1, as follows:

$$\Phi_n = \left\{ i \left| \frac{n}{N} \leq s_{ji} < \frac{n+1}{N} \right. \right\} \text{ for each } n \quad (4)$$

$$h_n^s = |\Phi_n| \quad (5)$$

As a result, the luma histogram $\{h_n^s\}$ of the reference tone-mapped image is built. Note that luma histograms of the reference tone-mapped images (117-1) can be built at one of various levels, such as for an image, a GOP, a scene, multiple scenes, etc. By way of example but not limitation, the frame index j has been dropped from expressions (4) and (5) above for simplicity.

In Step 3 of the histogram-based luma look matching process, a luma histogram (e.g., 304 of FIG. 3A, etc.) of the input image (302) is prepared or built based on the luma components $\{v_{ji}\}$ of the input image (302.

Assume there are M codeword bins for the high dynamic range of the input images (117) that include in the input image (302). All pixels in the input image (302) that have luma components $v_{ji}$ with values falling between $$\left[\frac{m}{M}, \frac{m+1}{M}\right)$$

form a set $\Psi_m$ and are counted in a pixel count $h_m^v$ represented in the $m^{th}$ bin of the luma histogram (304), where m=0, 1, ..., M−1, as follows:

$$\Psi_m = \left\{ i \left| \frac{m}{M} \leq v_{ji} < \frac{m+1}{M} \right. \right\} \text{ for each } m \quad (6)$$

$$h_m^v = |\Psi_m| \quad (7)$$

As a result, the luma histogram (304), $\{h_m^v\}$, of the input image (302) is built. Note that luma histograms including but not limited to the luma histogram (304) of the input images (117) can be built at one of various levels, such as for an image, a GOP, a scene, multiple scenes, etc. By way of example but not limitation, the frame index j has been dropped from expressions (6) and (7) above for simplicity. Note further that the luma histogram (304) of the input image (302) is to be transferred to luma histograms (e.g., one of which may 306 of FIG. 3A, etc.) of multiple mapped images. Thus, certain quantization-like operations may be performed as a part of transferring the luma histogram (304) of the input image (302) to the luma histograms (e.g., 306, etc.) of the multiple mapped images. In some embodiments, a higher precision for the luma histogram (304) of the input image (302) in the high dynamic range, as compared with the luma histograms (e.g., 306, etc.) of the mapped images in the relatively narrow dynamic range, may be used. Thus, in these embodiments, the luma histograms (e.g., 306, etc.) of the mapped images can be obtained with less quantization-like errors by setting M>N (e.g., M=1024, etc.).

In Step 4 of the histogram-based luma look matching process, a representative point is selected in each bin of the luma histogram (304) of the input image (302). In various embodiments, a very high precision of mapping the luma components $v_{ji}$ (e.g., represented in a look-up table or LUT, etc.) of the input image (302) to the luma components of the mapped images (e.g., 306, etc.) may or may not be needed. The total number of calculations for mapping the luma components $v_{ji}$ of the input image (302) to the luma components of the mapped images (e.g., 306, etc.) may be proportional to the number of entries of the LUT. In some embodiments, to simplify transferring the luma histogram (304) of the input image (302) to the luma histograms (e.g., 306, etc.) of the mapped images, M different $v_{ji}$ value (with equal distance) may be selected to respectively represent luma components of M different bins of the luma histogram (304) of the input image (302). The representative point, denoted as $v_m$, in each bin m of the luma histogram (304) of the input image (302) may be selected as follows:

$$v_m = \frac{1}{2M} + \frac{m}{M} \text{ for each } m \quad (8)$$

In Step 5 of the histogram-based luma look matching process, a mapped point in the relatively narrow dynamic range (or mapped domain) that is mapped from the representative point in each bin of the luma histogram (304) of the input image (30) is determined based on a combined function $LUT^t$, as follows:

$$y_m^t = LUT^t(v_m) = \text{clip3}\left(\text{round}\left(\frac{g(f(T(v_m), t))}{\Delta}\right), 0, N-1\right) \quad (9)$$

where $$\Delta = \frac{2^{BL\_bit\_dehth}}{N} \quad (10)$$

Note that the output of the luma forward reshaping function (e.g., 218 of FIG. 2B or FIG. 3A, etc.), as given by $g(f(T(v_m),t)$ in expression (9), is already in the relatively narrow dynamic range (e.g., 10-bit base layer, an SDR (BL) bit depth, etc.) of the mapped images. Since luma components of the mapped images are to be grouped into N bins, it is relatively efficient for histogram transfer as described herein to have the mapped point, as determined by the combined function $LUT^t$, to be translated into an index value between 0 and N−1. In some embodiments, a round operation such as a quantization by A is performed in expression (9) on the output of the luma forward reshaping function (218) (as given by $g(f(T(v_m),t)$ in expression (9)) to obtain the mapped point, which can then be translated or used to determine an index value n corresponding to the $n^{th}$ bin of the N bins of the luma histogram (e.g., 306, etc.) of the mapped image(s).

In Step 6 of the histogram-based luma look matching process, bins in the luma histogram (304) of the input image (302 that are mapped to the same mapped point or the same bin of the luma histogram (306) of the mapped image are combined into the same bin of the luma histogram (306) of the mapped image.

Denote bins of the luma histogram (306) of the mapped image as $\hat{h}_n^t$, where n=0, 1, . . . , N−1. The bins $\hat{h}_n^t$ of the luma histogram (306) of the mapped image may be initialized 0 before mapping/combining the bins of the luma histogram (306) of the input image into the bins k of the luma histogram (306) of the mapped image. For each representative point, $v_m$, in each bin of the luma histogram (304) of the input image (302), the corresponding mapped value $y_m^t$ is determined in expression (9). Pixel counts (as represented by frequency axes of FIG. 3A) in one or multiple bins in the luma histogram (304) of the input image (302) that have representative point(s) mapped to the mapped point(s) in the same bin $\hat{h}_n^t$ of the luma histogram (306) of the mapped image are combined into the same pixel count of the same bin $\hat{h}_n^t$ of the luma histogram (306) of the mapped image. An example algorithm for histogram transfer is shown in TABLE 2 below.

TABLE 2

Initialize bins of $\hat{h}_n^t$ to zero
for( m = 0; m < M; m++ ){
   $y_m^t$ = $LUT^t$ ($v_m$) , where $y_m^t$ is located in the $n^{th}$ SDR bin
   $\hat{h}_n^t$ = $\hat{h}_n^t$ + $h_m^v$
}

As a result, the luma histogram (304) of the input image (302) is transferred or mapped to the luma histogram (306) of the mapped image that correspond to any given set of candidate parameter values for the luma mapping parameters t, while avoiding actually generating the mapped image and/or while avoiding actually generating the luma components of the mapped image.

In some embodiments, the sum of pixel counts of all the luma histograms for the mapped image, the reference tone-mapped image and the input image (302) may be explicitly or implicitly constrained in the histogram-based luma look matching process by equality relationship(s) as follows:

$$\sum_{n=0}^{N-1} \hat{h}_n^t = \sum_{n=0}^{N-1} h_n^s = \sum_{m=0}^{M-1} h_m^v \quad (11)$$

It may be noted that Steps 1-4 as detailed above are independent of the luma mapping parameters t. Thus, these steps may be done once in some embodiments. Steps 5 and 6 may be repeated for different combinations of candidate parameter values for the luma mapping parameters t that are used in the luma forward reshaping function (218).

In some embodiments, a score in the distance/similarity measurement between two histograms $\{h_n^s\}$ and $\{\hat{h}_n^r\}$ may be defined as follows:

$$SIM(\{\hat{h}_n^t\},\{\hat{h}_n^r\}) \quad (12)$$

The problem for best matching luma looks can be formulated as an optimization problem to maximize the scores in the distance/similarity measurement by searching all feasible/possible combinations of candidate parameter values for the luma mapping parameters t, as follows:

$$\max_t SIM(\{\hat{h}_n^t\}, \{h_n^s\}) \quad (13)$$

In some embodiments, the score in the distance/similarity measurement between two histograms $\{h_n^s\}$ and $\{\hat{h}_n^r\}$ can be defined as a histogram intersection, as follows:

$$SIM(\{\hat{h}_n^t\}, \{h_n^s\}) = \left(\sum_{n=0}^{N-1} \min(\hat{h}_n^t, h_n^s)\right) \quad (14)$$

In other word, in each bin in the relatively narrow dynamic range in which the reference tone-mapped image and the mapped image are represented, the minimal value of the pixel counts in the bin from the luma histograms $\{h_n^r\}$ and $\{\hat{h}_n^r\}$ is selected to be summed up on the right hand side (RHS) of expression (14). When the two histograms have little overlap, the sum of the minimal values across all bins will be small. On the other hand, when two histograms have significant overlap, the sum of the minimal values across all bins will be relatively large.

Luma-Look Matching Processes

FIG. 2C illustrates an example luma-look matching process in which optimized parameter values for luma mapping parameters are determined for forward reshaping luma codewords of the input images (117) to luma codewords of optimized forward reshaped images (182). Luma-look matching of FIG. 2C may be performed by one or more computing devices (e.g., coding block (120), luma forward reshaping block (162), etc.) on a frame basis, a Group of Pictures (GOP) basis, a scene basis, a multi-scene basis, etc. In some embodiments, a process (e.g., MMR-based optimization process, etc.) operating in conjunction with that of FIG. 2C may also be performed to determine/select optimized parameter values for chroma mapping parameters by one or more computing devices (e.g., coding block (120), chroma forward reshaping block (165), etc.) on a frame basis, a Group of Pictures (GOP) basis, a scene basis, a multi-scene basis, etc.

In block 222 the luma histograms of the reference tone-mapped image and the input image corresponding to the reference tone-mapped image are pre-calculated. For example, the luma histogram $\{h_n^s\}$ of the reference tone-mapped image may be obtained with reduced sample points N, whereas the luma histogram $\{h_m^s\}$ the input image may be obtained with reduced sample points M.

In a loop implemented between blocks 224 and 232, operations between blocks 224 and 232 as represented by blocks 224, 226, 228, 230 and 232 are repeated or iterated over each of all possible combinations of candidate parameter values for the luma mapping parameters t, until the last combination of parameter values is reached in block 232.

In block 226, the luma histogram $\{h_m^v\}$ of the input image obtained with reduced sample points M is used to derive a luma histogram $\{\hat{h}_n^t\}$ of a mapped image that comprises luma components forward reshaped from luma components of the input image using the luma forward reshaping function (218) with the current combination of parameter values for the loop. It should be noted that the luma histogram $\{\hat{h}_n^t\}$ of the mapped image can be derived via histogram transfer as described herein without actually generating the mapped image and/or without actually generating luma components (and chroma components) of the mapped image.

In block 228, the luma histogram $\{\hat{h}_n^r\}$ of the mapped image may be compared with the luma histogram $\{h_n^s\}$ of the reference tone-mapped image. In some embodiments, the comparison of the luma histograms $\{\hat{h}_n^r\}$ and $\{h_n^s\}$ may be performed using a score computed with expression (12).

In block 230, it is determined whether the luma look of the mapped image as represented by the luma histogram $\{\hat{h}_n^r\}$ of the mapped image matches the luma look of the reference tone-mapped image as represented by the luma histogram $\{h_n^s\}$ of the reference tone-mapped image better than the luma look of a previous mapped image with the current best found parameter values. Here the current best found parameter values correspond to a previous combination of candidate parameter values that generates the best matching luma look of all the previous mapped images with all the previous combinations of candidate parameter values that have been repeated or iterated before the current combination of candidate parameter values.

In response to determining that the luma look of the mapped image as represented by the luma histogram $\{\hat{h}_n^r\}$ of the mapped image matches the luma look of the reference tone-mapped image as represented by the luma histogram $\{h_n^s\}$ of the reference tone-mapped image better than the luma look of a previous mapped image with the current best found parameter values, the current best found parameter values are updated to be the current combination of candidate parameter values in block 230.

On the other hand, in response to determining that the luma look of the mapped image as represented by the luma histogram $\{\hat{h}_n^r\}$ of the mapped image matches the luma look of the reference tone-mapped image as represented by the luma histogram $\{\hat{h}_n^r\}$ of the reference tone-mapped image no better than the luma look of a previous mapped image with the current best found parameter values, the current best found parameter values are not updated in block 230.

In block 234, the current best found parameter values are chosen to be optimal parameter values for the luma mapping parameters. The optimal parameter values for the luma mapping parameters are used in the luma forward reshaping function (218) to generate an optimized luma forward reshaping function to forward reshape the luma components of the input image (e.g., in the input images (117), etc.) into luma components of an optimized forward reshaped image (e.g., in the optimized forward reshaped images (182), etc.).

An example algorithm implementing the histogram-based luma look matching process of FIG. 2C is shown in TABLE 3 below.

TABLE 3

// pre-calculate luma histograms
//   obtain the luma histogram $\{h_n^s\}$ of the reference tone-mapped image
//   with reduced sample points N.
//   obtain the luma histogram $\{h_m^v\}$ of the input image
//   with reduced sample points M.
// a "for" loop over different combinations of candidate parameter values
// for the luma mapping parameters (e.g., SOP, LGG, etc.)
for all considered SOP parameter t
    Create a 1D-LUT which combines all operations, namely, $LUT^t (v_m)$
    // histogram transfer
    Find mapped point $y_m^t = LUT^t (v_m)$
    Histogram transfer $\{\hat{h}_n^r\}$
    // histogram similarity
    Calculate similarity SIM $(\{\hat{h}_n^r\},\{h_n^s\})$
    // update best found parameter values
End
// determine the optimized luma forward reshaping function
Choose the t values which have the best similarity score.

Computational complexity for the histogram-based luma look matching process of FIG. 2C includes computational complexity of O(L*M) for histogram transfer and similarity computation, where L is the number of all possible combinations of candidate parameter values for the luma mapping parameters and M is the number (e.g., M is 1024 while N is 256, etc.) of bins in the luma histogram of the input image of the high dynamic range. Compared with the pixel based luma look matching process as shown in TABLE 1 that has the computational complexity of O(LP), where P is the number of pixels, the computational complexity for the histogram-based luma look matching process of FIG. 2C is much more efficient. For example, the number of pixels (P) in UHD pictures/images can be as high as 8,294,400. Thus, the histogram-based luma look matching process of FIG. 2C is 8100 times more efficient than the pixel-based luma look matching process as shown in TABLE 1.

Furthermore, it may be noted that constructing an LUT (e.g., 1D-LUT) such as used in expression (9) can be computation intensive. A further efficient way as shown in TABLE 4 below is to separate the LUT into (1) a first part that represents a fixed part (e.g., mappings from PQ to gamma or from PQ to HLG, etc.) independent of the luma mapping parameters, and (2) a second part that is dependent on the luma mapping parameters. Computations for the first part can be performed only once, while computation for the second part may be repeated for different possible combinations of candidate parameter values for the luma mapping parameters. The computation for the second part can also be sped up. For example, an entire full precision LUT used in the second part may or may not be generated. Given a 16-bit codeword space, while the entire full precision LUT may be generated with calculations for all $2^{16}$ entries of such an LUT, a partial precision LUT with fewer entries such as $2^{10}$ entries can be generated instead for the purpose of attaining computational efficiency with relatively small losses in performance or accuracy.

TABLE 4

// pre-calculate luma histograms
//   obtain the luma histogram $\{h_n^s\}$ of the reference tone-mapped image
//   with reduced sample points N.
//   obtain the luma histogram $\{h_m^v\}$ of the input image
//   with reduced sample points M.
// create the first part or the fixed part of 1D-LUT that
// performs tone mapping with reduced sample, $\tilde{y}_m = T(v_m)$
/// a "for" loop over different combinations of candidate parameter values
// for the luma mapping parameters (e.g., SOP, LGG, etc.)
for all considered SOP parameter t
    // create the second part of 1D-LUT $LUT^t (v_m)$
    // based on $y_m = T (v_m)$ via coarse sampling point
    //histogram transfer
    Find mapped point $\tilde{y}_m^t = LUT^t (v_m)$
    Histogram transfer $\{\hat{h}_n^r\}$
    // histogram similarity
    Calculate similarity SIM $(\{\hat{h}_n^r\},\{h_n^s\})$
    // update best found parameter values
End
// determine the optimized luma forward reshaping function
Choose the t values which have the best similarity score.

Computational complexity of the simplified process as shown in TABLE 4 based on a coarse precision LUT is O(L*M). In example operational scenarios in which M=1024, EDR_BIT_DEPTH=16, the simplified process as shown in TABLE 4 generates a further 64 times faster speed as compared with computational complexity $O(L*2^{EDR\_bit\_depth})$ based on the full precision LUT.

Example Luma Histograms

Figure 3B:
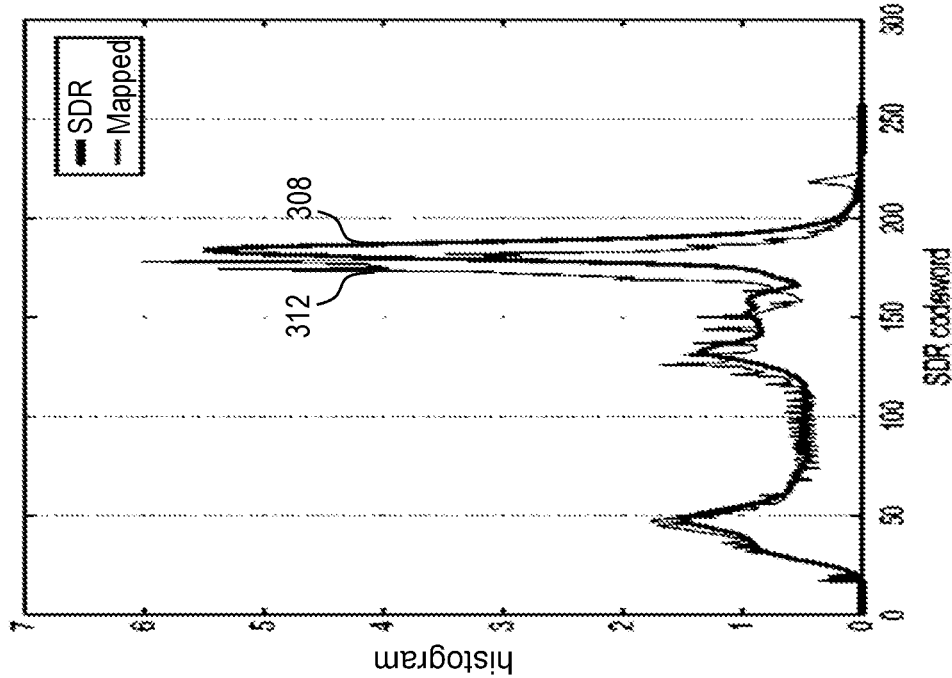
FIG. 3B illustrates example luma histograms with matched and unmatched luma looks.
Figure 3B:
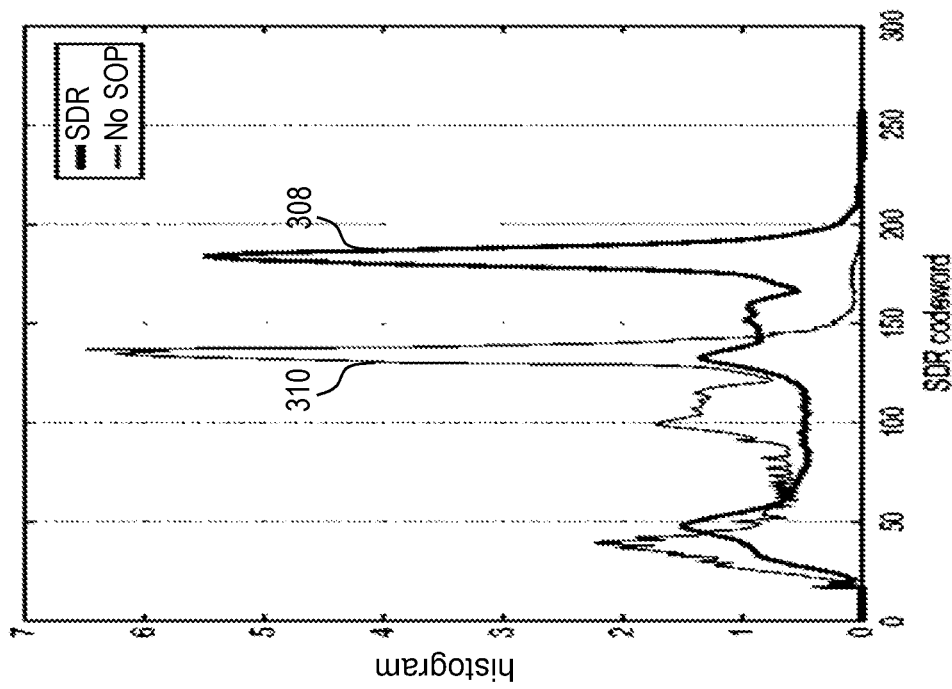

FIG. 3B illustrates example luma histograms. A luma histogram of a reference tone-mapped image, which is created with a colorist's artistic intent, is represented by a first histogram plot 308. A luma histogram of a mapped image, which is created with the luma forward reshaping function (e.g., with all SOP parameters set to 0, etc.) without any adjustment using the luma mapping parameters (e.g., SOP, LGG, etc.), is represented by a second histogram plot 310. As shown in FIG. 3B, the luma histogram of the mapped image created with the luma forward reshaping function without any adjustment using the luma mapping parameters is dissimilar to the luma histogram of the reference tone-mapped image created with the colorist's artistic intent. For example, such a mapped image may look overall dark as compared with the reference tone-mapped image.

Under techniques as described herein, the best parameter values may be found among all possible combinations of candidate parameter values through a combination of histogram preparation, histogram transfer and histogram similarity determination. A luma histogram of the best luma look matching mapped image, which is created with the luma forward reshaping function using the luma mapping parameters (e.g., SOP, LGG, etc.) based on the best parameter values, is represented by a third histogram plot 312. As shown, the luma histograms 308 and 312 of the reference tone-mapped image and the best luma look matching mapped image created with the luma forward reshaping function using the luma mapping parameters (e.g., SOP, LGG, etc.) based on the best parameter values have much better similarity than the luma histograms 310 and 312 of the reference tone-mapped image and the mapped image created with the luma forward reshaping function without any adjustment using the luma mapping parameters.

Additional Examples of Luma-Look Similarity Measurements

In some embodiments, the luma look in some luma codeword regions (e.g., highlight regions, dark areas, midtone regions, etc.) may be relatively important as compared with some other luma codeword regions. The former luma codeword regions may be identified in images as described herein, and may be assigned with higher weighting factor values in the histogram-based luma look matching process.

Denote weighting factors for bins of the luma histograms $\{h_n^s\}$ and $\{\hat{h}_n^t\}$ as $\{w_n\}$. In some embodiments, a score in the distance/similarity measurement between two histograms $\{h_n^s\}$ and $\{\hat{h}_n^t\}$ may be defined as follows:

$$SIM(\{\hat{h}_n^t\}, \{h_n^s\}, \{w_n\}) \quad (15)$$

The problem for best matching luma looks can be formulated as an optimization problem to maximize the scores in the distance/similarity measurement by searching all feasible/possible combinations of candidate parameter values for the luma mapping parameters t, as follows:

$$\max_t SIM(\{\hat{h}_n^t\}, \{h_n^s\}, \{w_n\}) \quad (16)$$

In some embodiments, the score in the distance/similarity measurement between two histograms $\{h_n^s\}$ and $\{\hat{h}_n^t\}$ can be defined as a histogram intersection, as follows:

$$SIM(\{\hat{h}_n^t\}, \{h_n^s\}, \{w_n\}) = \left(\sum_{n=0}^{N-1} w_n \cdot \min(\hat{h}_n^t, h_n^s)\right) \quad (17)$$

In some embodiments, instead of computing the similarity for all bins of the entire histograms, peaks in the histograms may be identified or detected after the histograms are applied with a medium filter. A search for the best parameter values for the luma mapping parameters may be conducted among all candidate combinations of parameter values for the luma mapping parameters using scores that are computed based on subsets of bins in all the bins of the entire histograms, where the subsets of bins correspond to the detected peaks in the histograms. Additionally, optionally or alternatively, spatial registration may be used to avoid matching wrong pairs of peaks of the histograms.

Techniques as described herein can be implemented with any in a wide variety of ways of assessing the distance/similarity measurements between two histograms. For example, in some embodiments, instead of using one or both of expressions (14) and (17) as discussed above, the best score in the distance/similarity measurement between two histograms such as $\{h_n^s\}$ and $\{\hat{h}_n^t\}$ can be determined using one or both of the following expressions:

$$SIM(\{\hat{h}_n^t\}, \{h_n^s\}, \{w_n\}) = \left(\sum_{n=0}^{N-1} \min(\hat{h}_n^t, h_n^s)/\max(\hat{h}_n^t, h_n^s)\right) \quad (18)$$

$$SIM(\{\hat{h}_n^t\}, \{h_n^s\}, \{w_n\}) = \left(\sum_{n=0}^{N-1} w_n \cdot \min(\hat{h}_n^t, h_n^s)/\max(\hat{h}_n^t, h_n^s)\right) \quad (19)$$

Thus, these and other ways of assessing the distance/similarity measurements between two histograms may be used in various embodiments.

Example Process Flows

FIG. 4A illustrates an example process flow according to an embodiment of the present invention. In some embodiments, one or more computing devices or components (e.g., an encoding device/module, a transcoding device/module, a decoding device/module, a tone mapping device/module, a graphic blending device, an image blending device/module, a media device/module, etc.) may perform this process flow. In block 402, an image processing device (e.g., coding block (120), etc.) generates, based at least in part on (a) a luma histogram over a high dynamic range and (b) a plurality of combinations of candidate parameter values for one or more luma mapping parameters, a plurality of luma histograms over a relatively narrow dynamic range. The luma histogram over the high dynamic range is generated based on one or more input images of the high dynamic range. Each luma histogram in the plurality of luma histograms over the relatively narrow dynamic range is generated based at least in part on the luma histogram over a high dynamic range and a respective combination of candidate parameter values in the plurality of combinations of candidate parameter values for the one or more luma mapping parameters.

In block 404, the image processing device compares the plurality of luma histograms over the relatively narrow dynamic range with a luma histogram of one or more reference tone-mapped images over the relatively narrow dynamic range.

In block 406, the image processing device selects, based on results of comparing the plurality of luma histograms with the luma histogram of the one or more reference tone-mapped images, a specific combination of candidate parameter values from among the plurality of combinations of candidate parameter values.

In block 408, the image processing device uses a luma forward reshaping function with the one or more luma parameter values that are set to the specific combination of candidate parameter values to forward reshape luma components of the one or more input images into luma components of one or more forward reshaped images over the relatively narrow dynamic range.

In block 410, the image processing device transmits the one or more forward reshaped images to one or more recipient devices.

In an embodiment, the luma forward reshaping function maps the one or more input images into the one or more forward reshaped images free of clipping.

In an embodiment, the image processing device is further configured to perform: generating backward reshaping metadata that is to be used by the one or more recipient devices to generate a luma backward reshaping function that corresponds to an inverse of the luma forward reshaping function with the one or more luma parameter values set to the specific combination of candidate parameter values; transmitting the one or more forward reshaped images with the backward reshaping metadata to the one or more recipient devices; etc.

In an embodiment, the image processing device is further configured to perform: deriving a chroma forward reshaping mapping for predicting chroma codewords of the one or more forward reshaped images, the chroma forward reshaping mapping being generated using chroma codewords of the one or more reference tone-mapped images as a prediction target; generating a portion of backward reshaping metadata that is to be used by the one or more recipient devices to generate a chroma backward reshaping mapping; transmitting the one or more forward reshaped images with the backward reshaping metadata to the one or more recipient devices; etc.

In an embodiment, the chroma forward reshaping mapping is generated based on a multivariate multi-regression (MMR)-based algorithm that supports multiple-channel reshaping.

In an embodiment, the luma forward reshaping function is derived as a combination of one or more of: luma tone-mapping functions, luma tone-mapping modification functions, electro-optical transfer functions, content-adaptive-quantized functions generated based on noise measurements of the one or more input images, etc.

In an embodiment, the one or more luma mapping parameters comprise one or more of: slope, offset and power (SOP) parameters; lift, gain and gamma (LGG) parameters; other luma mapping parameters; etc.

In an embodiment, one or both of the one or more input images or the one or more reference tone-mapped images are generated in post-production editing.

In an embodiment, the one or more forward reshaped images are encoded in a video signal of the relatively narrow dynamic range; the backward reshaping metadata is carried in the video signal as metadata separate from the one or more forward reshaped image. In an embodiment, the video signal excludes one or both of the one or more input images or the one or more reference tone-mapped images.

In an embodiment, the one or more input images are represented in a different color space than that in which the one or more reference tone-mapped images are represented.

In an embodiment, the one or more input images are formatted in a different sampling format than that in which the one or more reference tone-mapped images are formatted.

In an embodiment, at least one of the one or more input images or the one or more reference tone-mapped images are represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, a standard dynamic range (SDR) color space, etc.

In an embodiment, the one or more forward reshaped images are represented in a reshaped domain; the reshaped domain is of a bit depth of one of 8, 9, 10, 11+ bits, etc.

In an embodiment, the one or more input images are represented in a pre-reshaped domain; the pre-reshaped domain is of a bit depth of one of 10, 11, 12, 13, 14, 15+ bits, etc.

In an embodiment, one or both of the one or more input images or the one or more reference tone-mapped images are created based a video professional's artistic intent.

Figure 4B:
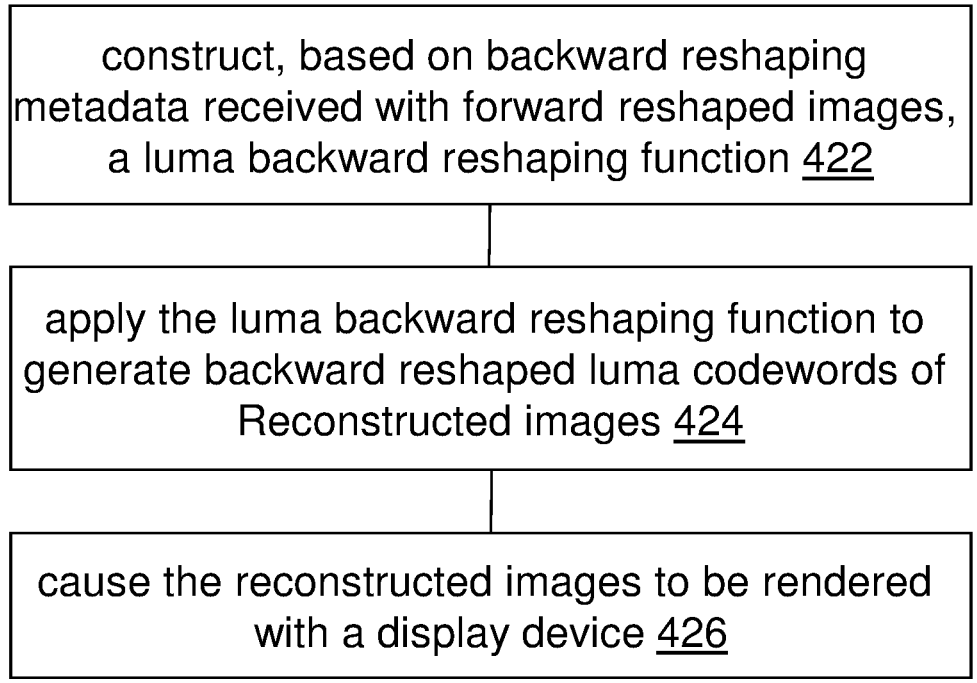

FIG. 4B illustrates an example process flow according to an embodiment of the present invention. In some embodiments, one or more computing devices or components (e.g., an encoding device/module, a transcoding device/module, a decoding device/module, a tone mapping device/module, a graphic blending device, an image blending device/module, a media device/module, etc.) may perform this process flow. In block 422, an image processing device (e.g., decoding block (130), etc.) constructs, based on backward reshaping metadata received with one or more forward reshaped images of a relatively narrow dynamic range, a luma backward reshaping function.

In an embodiment, the luma backward reshaped function represents an inverse of a luma forward reshaping function with one or more luma parameter values that are set to a specific combination of candidate parameter values.

In an embodiment, the luma forward reshaping function with the one or more luma parameter values set to the specific combination of candidate parameter values is used to forward reshape luma components of the one or more input images over a high dynamic range into luma components of the one or more forward reshaped images over the relatively narrow dynamic range.

In an embodiment, the specific combination of candidate parameter values is selected based on results of comparing a plurality of luma histograms with a luma histogram of one or more reference tone-mapped images over the relatively narrow dynamic range, from among a plurality of combinations of candidate parameter values.

In an embodiment, the plurality of luma histograms over the relatively narrow dynamic range is generated based at least in part on (a) a luma histogram over the high dynamic range and (b) the plurality of combinations of candidate parameter values for the one or more luma mapping parameters.

In an embodiment, the luma histogram over the high dynamic range is generated based on one or more input images of the high dynamic range. In an embodiment, each luma histogram in the plurality of luma histograms over the relatively narrow dynamic range is generated based at least in part on the luma histogram over a high dynamic range and a respective combination of candidate parameter values in the plurality of combinations of candidate parameter values for the one or more luma mapping parameters.

In block 424, the image processing device applies the luma backward reshaping function to luma components of the one or more forward reshaped images to generate luma codewords of one or more reconstructed images of the high dynamic range that approximate one or more input images of the high dynamic range.

In block 426, the image processing device causes the one or more reconstructed images to be rendered with a display device.

In an embodiment, the image processing device is further configured to perform: deriving, based on the backward reshaping metadata, a chroma backward reshaping mapping for predicting chroma codewords of the one or more reconstructed images; applying the chroma backward reshaping function to chroma components of the one or more forward reshaped images to generate chroma codewords of the one or more reconstructed images; etc.

In an embodiment, the chroma backward reshaping mapping is generated based on a multivariate multi-regression (MMR)-based algorithm that supports multiple-channel reshaping.

In an embodiment, the one or more forward reshaped images are decoded from a video signal of the relatively narrow dynamic range; the backward reshaping metadata is carried in the video signal as metadata separate from the one or more forward reshaped image.

In an embodiment, the video signal excludes one or both of the one or more input images or one or more reference tone-mapped images which the one or more forward reshaped images approximate.

In an embodiment, the one or more reconstructed images are represented in a different color space than that in which the one or more forward reshaped images are represented.

In an embodiment, the one or more reconstructed images are formatted in a different sampling format than that in which the one or more forward reshaped images are formatted.

In an embodiment, at least one of the one or more reconstructed images or the one or more forward reshaped images are represented in one of: an IPT PQ (ICtCp) color space, an YCbCr color space, an RGB color space, a Rec. 2020 color space, a Rec. 709 color space, an extended dynamic range (EDR) color space, a gamma color space, an HLG color space, a PQ color space, a standard dynamic range (SDR) color space, etc.

In an embodiment, the one or more forward reshaped images are represented in a reshaped domain; the reshaped domain is of a bit depth of one of 8, 9, 10, 11+ bits, etc.

In an embodiment, the one or more reconstructed images are represented in a pre-reshaped domain; the pre-reshaped domain is of a bit depth of one of 10, 11, 12, 13, 14, 15+ bits, etc.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
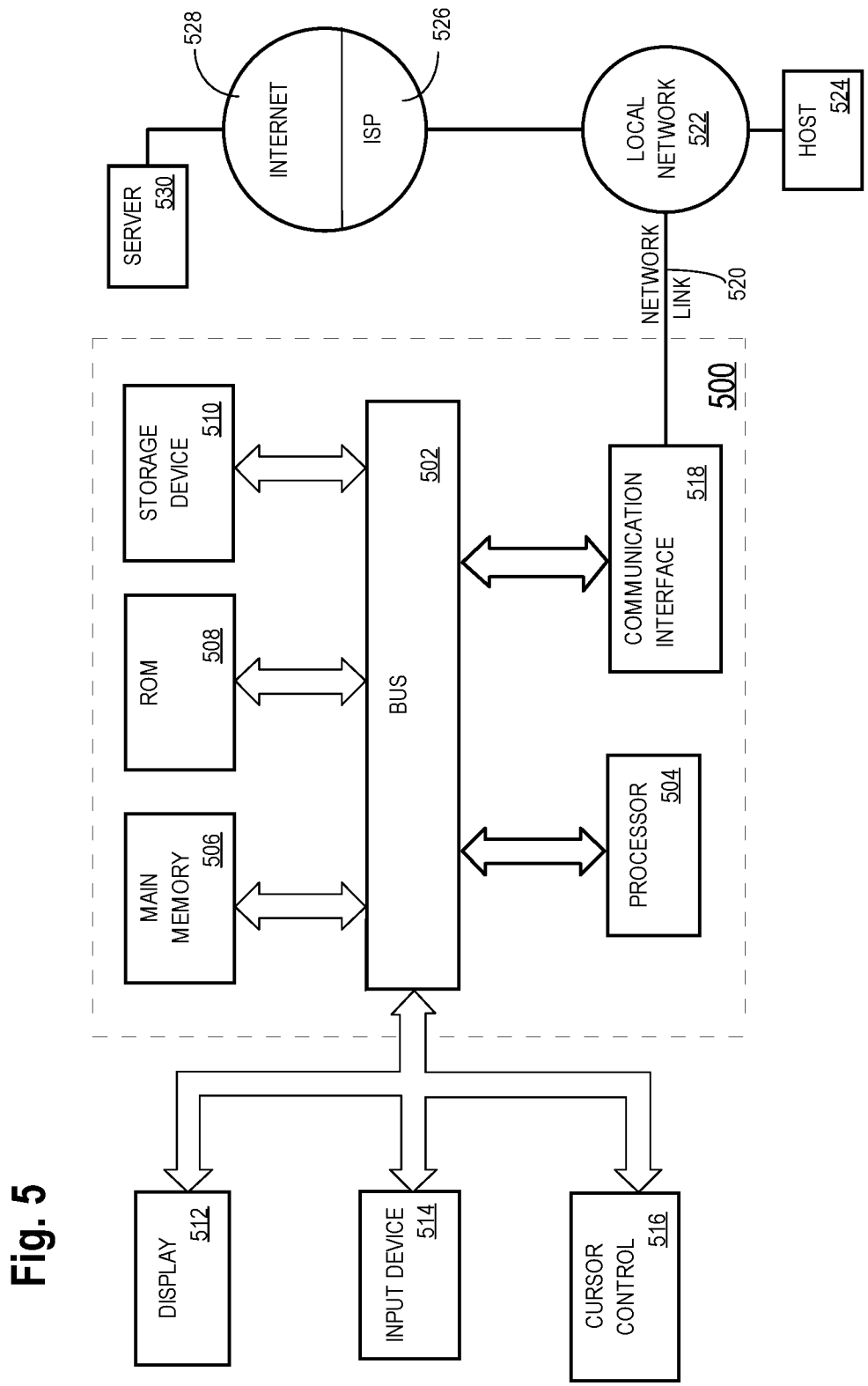
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for forward reshaping luma components of an input image of a first dynamic range, comprising:
   providing a reference tone-mapped image over a second dynamic range that corresponds to the input image of the first dynamic range, wherein the first dynamic range is greater than the second dynamic range;
   providing a luma forward reshaping function to forward reshape luma components of the input image of the first dynamic range into luma components of a corresponding forward reshaped image over the second dynamic range based on one or more luma mapping parameters;
   providing a plurality of combinations of candidate parameter values for the one or more luma mapping parameters;
   generating a luma histogram of the input image over the first dynamic range;
   generating a luma histogram of the reference tone-mapped image over the second dynamic range;
   generating a plurality of mapped luma histograms over the second dynamic range by converting, for each of the provided candidate parameter values for the one or more luma mapping parameters, the luma histogram of the input image over the first dynamic range via the luma forward reshaping function with a respective combination of the provided candidate parameter values to a corresponding mapped luma histogram over the second dynamic range;
   comparing the plurality of luma histograms over the second dynamic range with the luma histogram of the reference tone-mapped image over the second dynamic range;
   selecting, based on results of comparing the plurality of luma histograms with the luma histogram of the reference tone-mapped image, a specific combination of candidate parameter values from among the plurality of combinations of candidate parameter values;
   using the luma forward reshaping function with the one or more luma parameter values that are set to the specific combination of candidate parameter values to forward reshape luma components of the input image into the luma components of the corresponding forward reshaped image over the second dynamic range; and
   transmitting the corresponding forward reshaped image to one or more recipient devices.

2. The method of claim 1, wherein the luma forward reshaping function maps the input image into the corresponding forward reshaped image free of clipping.

3. The method of claim 1, further comprising:
   generating backward reshaping metadata that is to be used by the one or more recipient devices to generate a luma backward reshaping function that corresponds to an inverse of the luma forward reshaping function with the one or more luma parameter values set to the specific combination of candidate parameter values; and
   transmitting the forward reshaped image with the backward reshaping metadata to the one or more recipient devices.

4. The method of claim 1, further comprising:
   deriving a chroma forward reshaping mapping for predicting chroma codewords of the forward reshaped image, wherein the chroma forward reshaping mapping is generated using chroma codewords of the reference tone-mapped image as a prediction target;
   generating a portion of backward reshaping metadata that is to be used by the one or more recipient devices to generate a chroma backward reshaping mapping; and
   transmitting the forward reshaped image with the backward reshaping metadata to the one or more recipient devices.

5. The method of claim 4, wherein the chroma forward reshaping mapping is generated based on a multivariate multi-regression—MMR—based algorithm that supports multiple-channel reshaping.

6. The method of claim 1, wherein the luma forward reshaping function is derived as a combination of one or more of: luma tone-mapping functions, luma tone-mapping modification functions, electro-optical transfer functions, or content-adaptive-quantized functions generated based on noise measurements of the input image.

7. The method of claim 1, wherein the one or more luma mapping parameters comprise one or more of: slope, offset and power—SOP—parameters; lift, gain and gamma—LGG—parameters; or other luma mapping parameters.

8. The method of claim 1, wherein one or both of the input image or the reference tone-mapped image are generated in post-production editing.

9. The method of claim 1, wherein the forward reshaped image is encoded in a video signal of the second dynamic range, and wherein the backward reshaping metadata is carried in the video signal as metadata separate from the forward reshaped image.

10. The method of claim 9, wherein the video signal excludes one or both of the input image or the reference tone-mapped image.

11. The method of claim 1, wherein the input image is represented in a different color space than that in which the reference tone-mapped image is represented.

12. The method of claim 1, wherein the input image is formatted in a different sampling format than that in which the reference tone-mapped image is formatted.

13. The method of claim 1, wherein at least one of the input image or the reference tone-mapped image is represented in one of: an IPT PQ—ICtCp—color space, an YCbCr color space, an RGB color space, a Rec. 2020 color space, a Rec. 709 color space, an extended dynamic range—EDR—color space, a gamma/HLG/PQ color space, or a standard dynamic range—SDR—color space.

14. The method of claim 1, wherein the forward reshaped image is of a bit depth of one of 8, 9, 10, or 11+ bits.

15. The method of claim 1, wherein the input image is of a bit depth of one of 10, 11, 12, 13, 14, or 15+ bits.

16. The method of claim 1, wherein one or both of the input image or the reference tone-mapped image are created based a video professional's artistic intent.

17. A computer system configured to perform the method recited in claim 1.

18. An apparatus comprising a processor and configured to perform the method recited in claim 1.

19. A non-transitory computer-readable storage medium having stored thereon computer-executable instructions for executing a method with one or more processors in accordance with claim 1.

* * * * *